United States Patent
Matsumura et al.

(10) Patent No.: US 7,507,182 B2
(45) Date of Patent: Mar. 24, 2009

(54) CONTROLLER, CONTROL METHOD AND CONTROL SYSTEM FOR CONTROLLING A MOTOR VEHICLE GEAR-TYPE TRANSMISSION

(75) Inventors: Tetsuo Matsumura, Hitachinaka (JP); Yoshiyuki Yoshida, Hitachi (JP); Kentaro Shishido, Hitachinaka (JP); Tatsuya Ochi, Naka (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 11/353,020

(22) Filed: Feb. 14, 2006

(65) Prior Publication Data
US 2006/0185459 A1    Aug. 24, 2006

(30) Foreign Application Priority Data
Feb. 18, 2005  (JP) .............................. 2005-041930

(51) Int. Cl.
*B60W 10/04* (2006.01)
(52) U.S. Cl. ............................ 477/174; 74/329; 74/330; 74/333; 74/335; 74/339; 477/70; 477/166
(58) Field of Classification Search ........................ None
See application file for complete search history.

(56) References Cited

U.S. PATENT DOCUMENTS

| | | | | |
|---|---|---|---|---|
| 4,678,069 A | * | 7/1987 | Yoshimura et al. ............ 477/76 |
| 5,020,645 A | * | 6/1991 | Sasa ............................ 477/34 |
| 5,060,158 A | * | 10/1991 | Kono et al. .................. 701/67 |
| 6,341,541 B1 | * | 1/2002 | Sakamoto et al. .......... 74/665 A |
| 6,514,173 B2 | * | 2/2003 | Suzuki ....................... 477/124 |
| 2004/0127320 A1 | * | 7/2004 | Inoue et al. ................. 475/210 |

FOREIGN PATENT DOCUMENTS

| | | |
|---|---|---|
| JP | 8-54031 A | 2/1996 |
| JP | 2703169 B2 | 10/1997 |
| JP | 2000-234654 A | 8/2000 |
| JP | 2001-295898 A | 10/2001 |
| JP | 2003-120764 A | 4/2003 |

* cited by examiner

*Primary Examiner*—David D. Le
(74) *Attorney, Agent, or Firm*—Crowell & moring LLP

(57) ABSTRACT

A controller, control method, and control system for a motor vehicle gear-type transmission enable a friction transmission unit to be controlled to an optimum position according to a particular motor vehicle state or the like. A transmission control unit changes, via at least one parameter that indicates a state of the gear-type transmission or of the vehicle, a position or pressure load at which the pressure member is caused to stand by while the driving shaft of the vehicle is in a stopped state or during changeover of the mesh unit that connects to one of the gear pairs.

19 Claims, 23 Drawing Sheets

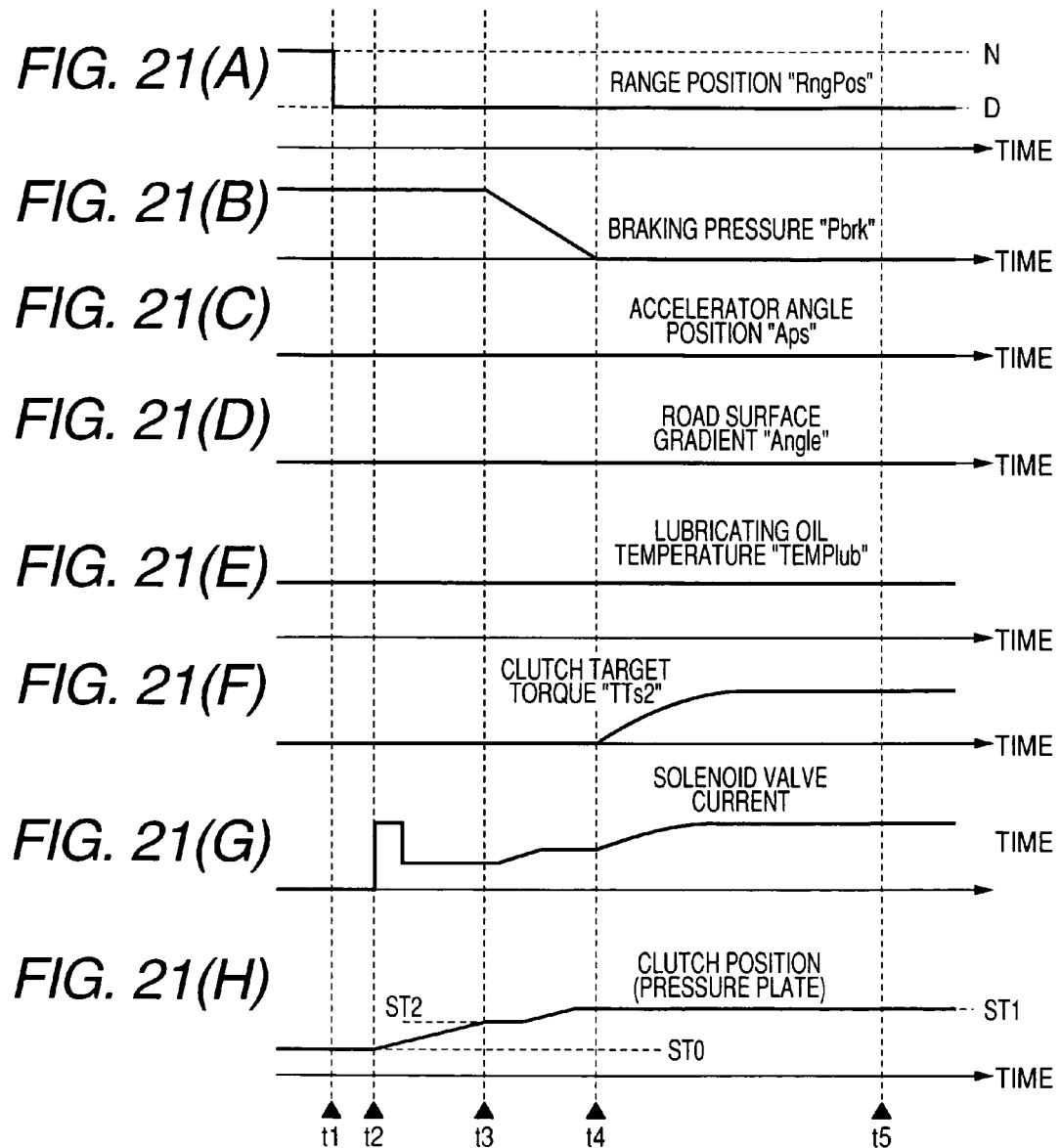

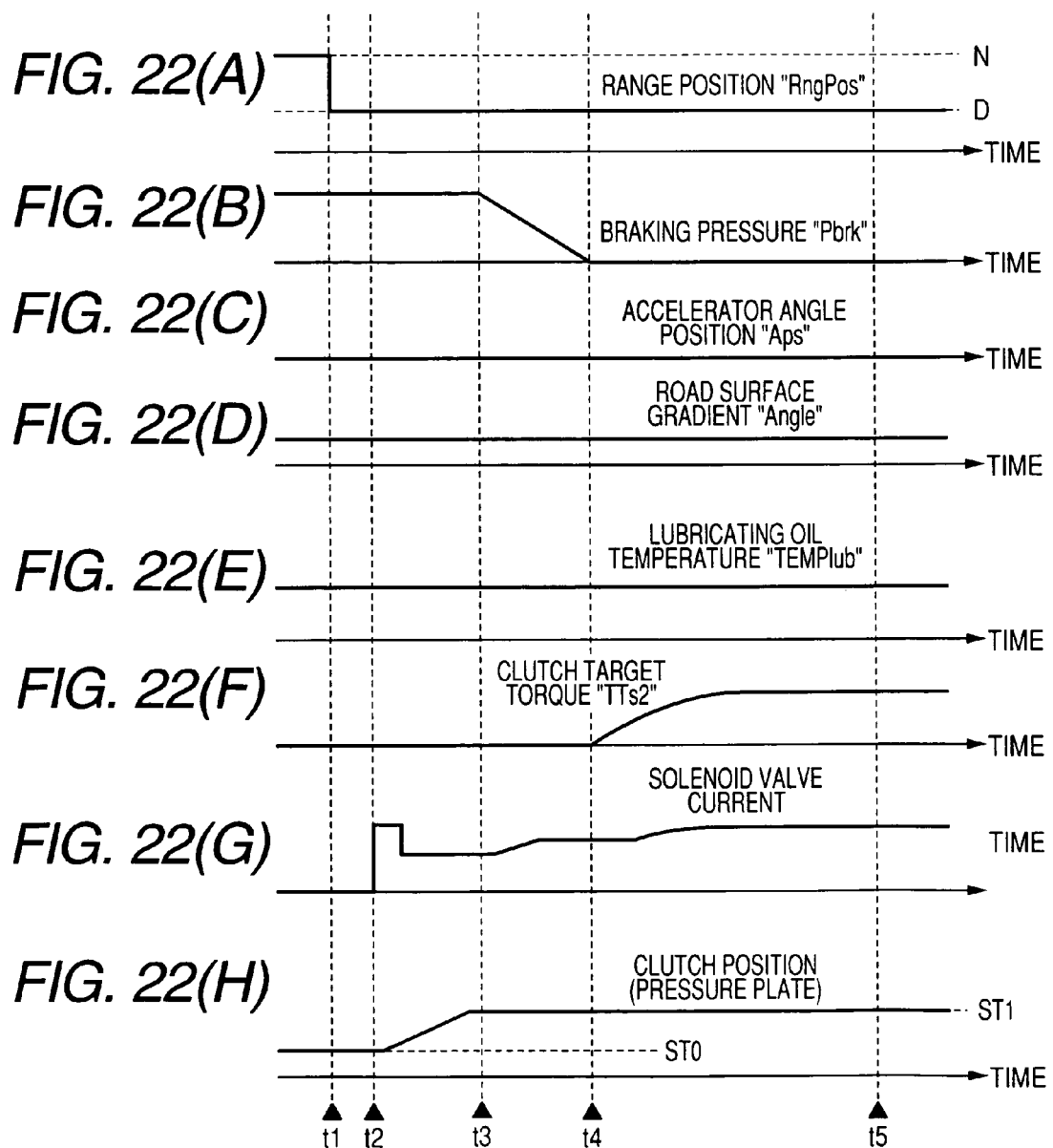

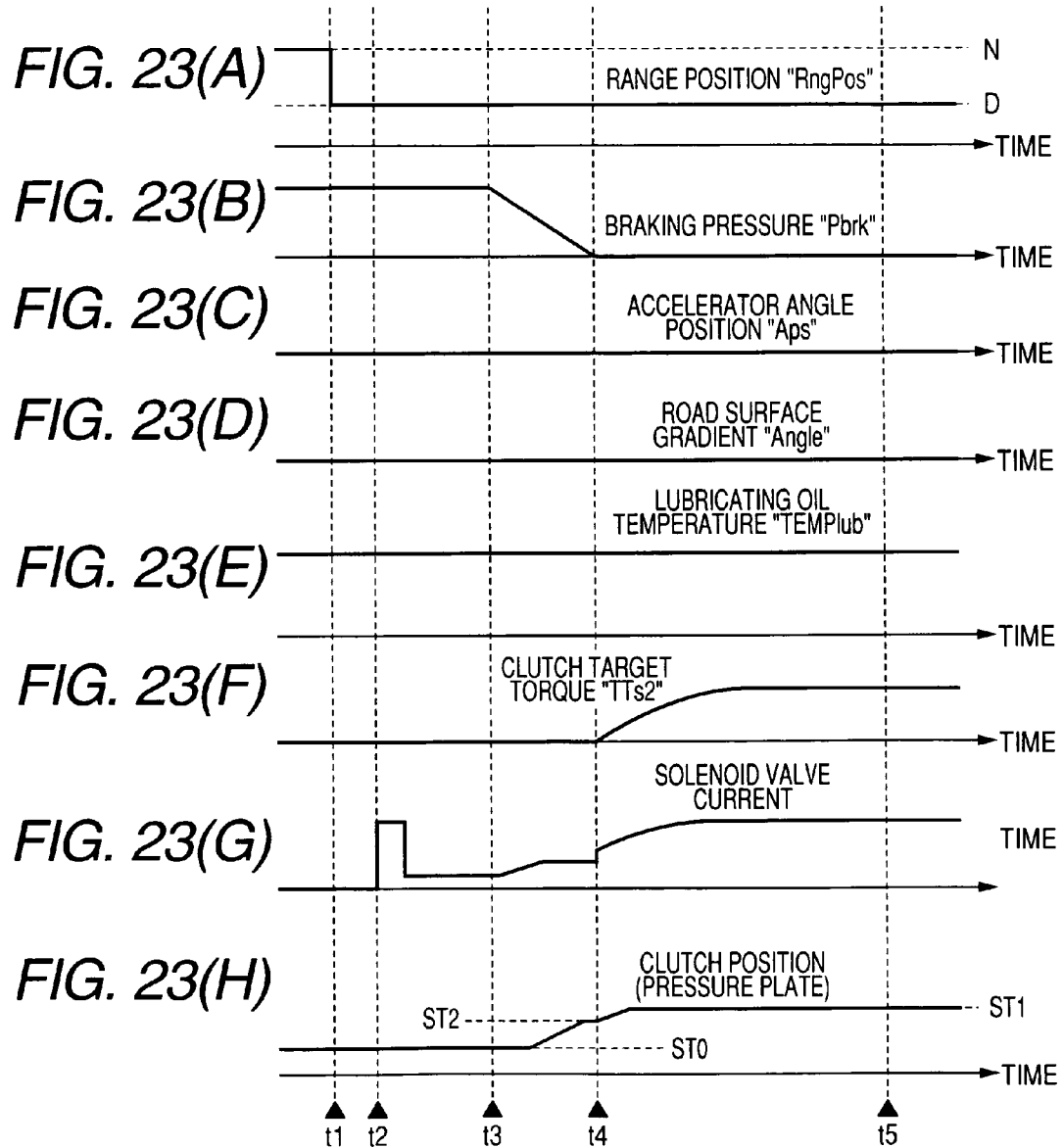

CONTROLLER, CONTROL METHOD AND CONTROL SYSTEM FOR CONTROLLING A MOTOR VEHICLE GEAR-TYPE TRANSMISSION

CLAIM OF PRIORITY

The present application claims priority from Japanese application serial no. 2005-041930, filed on Feb. 18, 2005, the content of which is hereby incorporated by reference into this application.

FIELD OF THE INVENTION

The present invention relates generally to controllers, control methods, and control systems for controlling automatic transmissions. More particularly, the invention relates to an automatic transmission controller, control method and control system suitable for controlling a gear-type automatic transmission for use in motor vehicles.

BACKGROUND OF THE INVENTION

Automated manual transmissions (hereinafter, referred to simply as "automated MTs") have been recently developed as systems in which a gear-type transmission for manual shift changes is used to automate the operation of a clutch which is a friction transmission mechanism, and the operation of a synchromesh mechanism which is one type of mesh mechanism. For automated MTs, the start of a shift change first disengages the clutch that transmits and cuts off the torque of an-engine which is a source of driving force, then switches the synchromesh mechanism, and engages the clutch once again.

Also, as described in Japanese Patent No. 2703169, an automated MT is known as a modification of a conventional automated MT. This automated MT has a wet-type multi-disc clutch as one form of friction transmission mechanism, thereby to transmit driving torque via the wet-type multi-disc clutch, even during shift changes. For this automated MT, the start of a shift change transmits input torque to the transmission via the wet-type multi-disc clutch, releasing the torque being transmitted by the gear that was working before the shift change, and disengaging this gear. The selected next change gear will be engaged when rotational control is conducted with the driving torque being transmitted via the wet-type multi-disc clutch and the input-shaft speed of the transmission reaches a speed equivalent to that of the selected next change gear. After that, the wet-type multi-disc clutch will be disengaged. Smooth shift changing that avoids driving torque interruptions can be implemented by, as described above, changing the driving torque in order from the before-shift-change gear ratio equivalent, to the gear ratio equivalent at which the wet-type multi-disc clutch is engaged, and further to the after-shift-change gear ratio equivalent.

In addition, as described in Japanese Patent Laid-Open No. 2000-234654, 2001-295898, and 2003-1200764, a twin-clutch automated MT is known that has two clutches to transmit input torque to the transmission, the two clutches being switched in an alternate fashion to transmit driving torque. In this twin-clutch automated MT, the start of a shift change progressively disengages the clutch that was transmitting the torque before the shift change, and at the same time, progressively engages the clutch of the next gear speed, thereby to change the driving torque in order from the before-shift-change gear ratio equivalent, to the after-shift-change gear ratio equivalent. Thus, driving torque interruptions are avoided and smooth shift changing is achieved.

Unlike the so-called automatic transmissions with a torque converter, the various types of automated MTs described above are free of so-called "creeping" due to the use of the torque converter. During vehicle start, therefore, these automated MTs generate pseudo-creeping by controlling the transmission torque of the particular clutch functioning to transmit and cut off the torque of the engine which is the source of driving force.

During the start of the vehicle with such an automated MT, it is desirable that the time from the release of a brake by a driver to the start of so-called "creeping" should be as short as possible. If the time from the start of clutch engagement to the transmission of torque to the transmission is too long, a feeling of delay in the vehicle start is likely to occur.

Japanese Patent Laid-Open No. Hei 8 (1996)-54031 describes a technique for shortening the time up to the rise of clutch transmission torque by advancing the clutch only through a certain stroke thereof while the vehicle is in a standby condition before being started.

SUMMARY OF THE INVENTION

However, since Japanese Patent Laid-Open No. Hei 8 (1996)-54031 does not describe a method of setting the foregoing standby position (condition), there has been the problem that the position cannot always be set according to the particular automobile state or the like. As a result, there has been another problem in that the time up to the rise of the transmission torque of the friction transmission mechanism during vehicle start becomes too long or in that a feeling of delay in the vehicle start occurs.

An object of the present invention is to provide a controller, control method, and control system for a motor vehicle gear-type transmission, adapted to enable a friction transmission mechanism to be controlled to an optimum position according to a particular motor vehicle state or the like.

In order to achieve the above object, an aspect of the present invention is a controller for controlling a motor vehicle gear-type transmission which has: a friction transmission mechanism that transmits power by adjusting a position or pressure load of a pressure member which applies pressure to a friction surface; an input shaft rotated by the torque transmitted from the friction transmission mechanism; an output shaft that outputs torque to a driving shaft of a motor vehicle; a plurality of gear pairs each rotating between the input shaft and the output shaft; a plurality of mesh mechanisms each establishing a required change gear position by connecting any one of the plural gear pairs to the input shaft or the output shaft; and an actuator that adjusts the position or pressure load of the pressure member.

This controller includes control means to change, by means of at least one of parameters each indicating a state of the gear-type transmission or of the vehicle, a position or pressure load at which the pressure member is caused to stand by while the driving shaft is in a stopped state or during changeover of the above-mentioned mesh mechanism that connects to the above-mentioned gear pair.

The above construction makes it possible to control the friction transmission mechanism to an optimum position according to a particular vehicle state or the like.

In order to achieve the above object, another aspect of the present invention is a method for controlling a motor vehicle gear-type transmission which has: a friction transmission mechanism that transmits power by adjusting a position or pressure load of a pressure member which applies pressure to a friction surface; an input shaft rotated by the torque transmitted from the friction transmission mechanism; an output shaft that outputs torque to a driving shaft of a motor vehicle; a plurality of gear pairs each rotating between the input shaft and the output shaft; a plurality of mesh mechanisms each establishing a required change gear position by connecting any one of the plural gear pairs to the input shaft or the output shaft; and an actuator that adjusts the position or pressure load of the pressure member.

This control method is adapted so as to change, by means of at least one of parameters each indicating a state of the gear-type transmission or of the vehicle, a position or pressure load at which the pressure member is caused to stand by while the driving shaft is in a stopped state or during changeover of the above-mentioned mesh mechanism that connects to the above-mentioned gear pair.

This control method makes it possible to control the friction transmission mechanism to an optimum position according to a particular vehicle state or the like.

In order to achieve the above object, yet another aspect of the present invention is a system for controlling a motor vehicle gear-type transmission, including: a controller adapted to transmit power to the gear-type transmission by adjusting a position or pressure load of a pressure member which applies pressure to a friction surface of a friction transmission mechanism, establish a required change gear position by connecting any one of plural gear pairs each rotating between an input shaft and an output shaft, both of which being constituent elements of the gear-type transmission, to the input shaft or the output shaft via any one of plural mesh mechanisms, and thus output a torque from the output shaft to a driving shaft of a vehicle; and an actuator that adjusts the position or pressure load of the pressure member in accordance with a control command from the controller of the gear-type transmission.

This control system further includes control means to change, by means of at least one of parameters each indicating a state of the gear-type transmission or of the vehicle, a position or pressure load at which the pressure member is caused to stand by while the driving shaft is in a stopped state or during changeover of the above-mentioned mesh mechanism that connects to the above-mentioned gear pair.

The above construction makes it possible to control the friction transmission mechanism to an optimum position according to a particular vehicle state or the like.

The parameters that each indicate a state of the gear-type transmission refer to parameters such as a friction surface temperature of the friction transmission mechanism, and a temperature of the lubricating oil that lubricates the friction transmission mechanism. The parameters that each indicate a state of the vehicle refer to parameters such as a gradient of a road surface, stepping-on force of a brake pedal, a pressure of a brake hydraulic cylinder, an operating/non-operating state of a parking brake, and a shift position of a shift lever.

According to the present invention, it is possible, by controlling the friction transmission mechanism to an optimum position according to a particular vehicle state or the like, to reduce the time required for a rise in transmission torque of the friction transmission mechanism during vehicle start, and thus to avoid the occurrence of a feeling of delay in the vehicle start.

BRIEF DESCRIPTION OF THE DRAWINGS

FIG. 21 is a timing chart showing a first example of vehicle start control by the controller for an automatic transmission according to the second embodiment of the present invention;

FIG. 22 is a timing chart showing a second example of vehicle start control by the controller for an automatic transmission according to the second embodiment of the present invention; and FIG. 23 is a timing chart showing a third example of vehicle start control by the controller for an automatic transmission according to the second embodiment of the present invention.

DESCRIPTION OF THE PREFERRED EMBODIMENTS

A construction and operation of a controller for a motor vehicle gear-type transmission according to a first embodiment of the present invention will be described hereunder using FIGS. 1 to 11.

First, a configuration of an vehicle having the automatic transmission controlled by the controller for a motor vehicle gear-type transmission according to the first embodiment is described below using FIG. 1.

Figure 1:
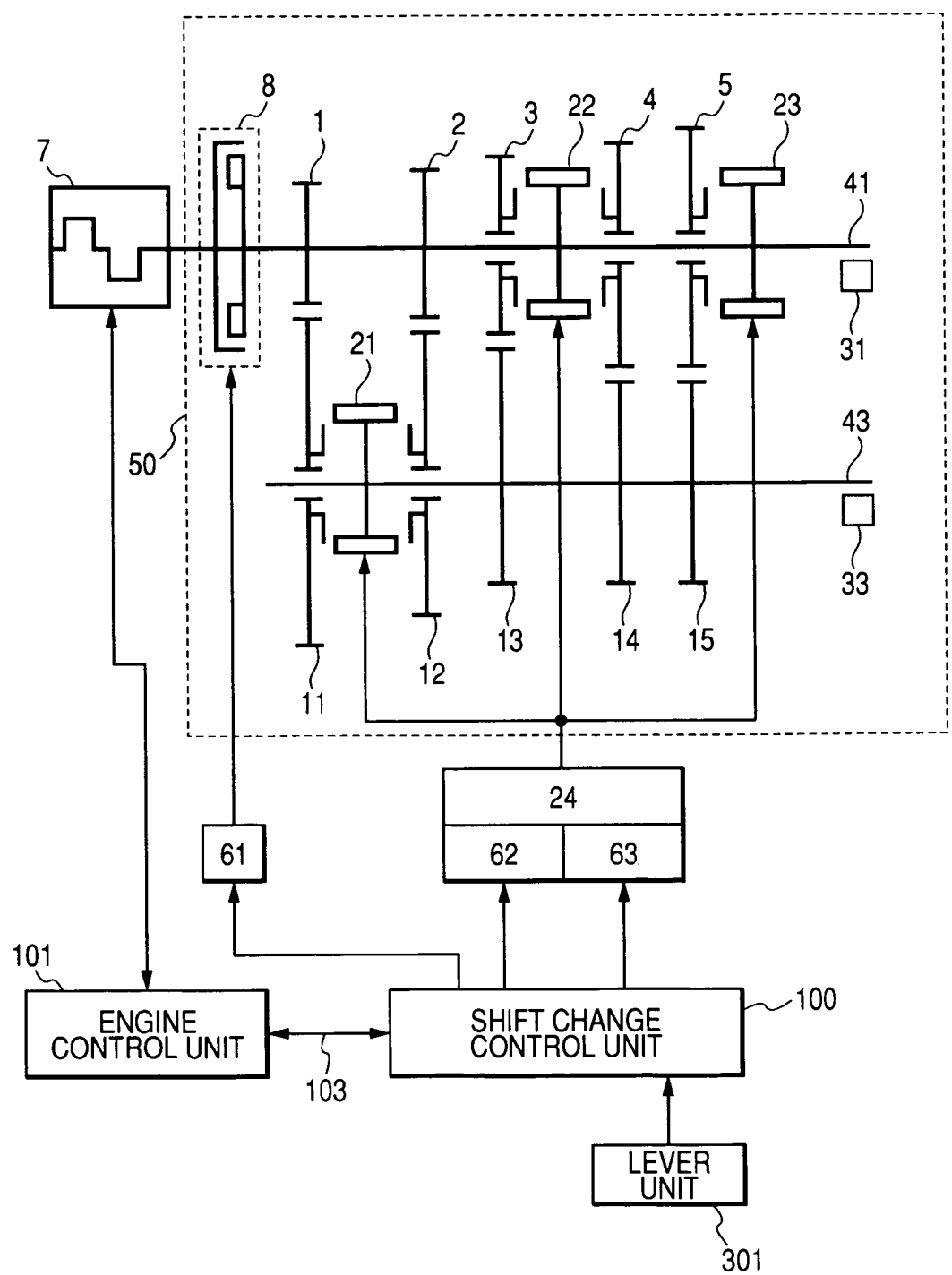
FIG. 1 is a skeleton diagram showing a system configuration of a vehicle which has an automatic transmission controlled by a motor vehicle transmission controller according to a first embodiment of the present invention.

FIG. 1 is a skeleton diagram showing a system configuration of the vehicle having the automatic transmission controlled by the controller for a motor vehicle gear-type transmission according to the first embodiment of the present invention.

The vehicle has an engine 7 that is a source of driving force, an engine speed sensor (not shown) that measures a speed of the engine 7, an electronically controlled throttle (not shown) that controls engine torque, and a fuel injector (not shown) for injecting the quantity of fuel that is appropriate for an air intake rate. The vehicle is constructed so that an engine control unit 101 controls torque of the engine 7 very accurately by controlling the air intake rate, the quantity of fuel, ignition timing, and other factors. Either an air intake port injection scheme that injects the fuel into an air intake port, or an in-cylinder injection scheme that injects the fuel directly into a cylinder can be adopted for the fuel injector. It is advantageous, however, to adopt the engine scheme that consumes less fuel and provides higher exhaust performance, compared in terms of the operating region required of the engine (the region determined by the engine torque and the engine speed). The source of driving force can be not only a gasoline engine, but also a diesel engine, a natural gas engine, a motor, or the like.

Automatic transmission 50 includes an input shaft clutch 8, a transmission input shaft 41, a transmission output shaft 43, a first drive gear 1, a second drive gear 2, a third drive gear 3, a fourth drive gear 4, a fifth drive gear 5, a first driven gear 11, a second driven gear 12, a third driven gear 13, a fourth driven gear 14, a fifth driven gear 15, a first mesh transmission unit 21, a second mesh transmission unit 22, a third mesh transmission unit 23, a speed sensor 31, and a speed sensor 33. Engaging or disengaging the input shaft clutch 8 makes it possible to transmit the torque of the engine 7 to the transmission input shaft 41 or cut off the transmission of the torque, respectively. A dry-type single-disc clutch is generally used as the input shaft clutch 8. Alternatively, however, a dry-type multi-disc clutch, a wet-type multi-disc clutch, or any other friction transmission unit can be used as the clutch 8. An electrically driven actuator 61 is used to control pressing force of the input shaft clutch 8 (i.e., input shaft clutch torque). The input shaft clutch actuator 61 controls transmission torque of the input shaft clutch 8 by controlling an electric current of a motor (not shown) provided on/in the input shaft clutch actuator 61.

The transmission input shaft 41 has the first drive gear 1, the second drive gear 2, the third drive gear 3, the fourth drive gear 4, and the fifth drive gear 5. The first drive gear 1 and the second drive gear 2 are secured to the transmission input shaft 41, and the third drive gear 3, the fourth drive gear 4, and the fifth drive gear 5 are provided so as to be rotatable with respect to the transmission input shaft 41. On the transmission input shaft 41, the speed sensor 31 is also provided as a detector of the input shaft speed that is the number of rotations of the transmission input shaft 41.

The transmission output shaft 43 has the first driven gear 11, the second driven gear 12, the third driven gear 13, the fourth driven gear 14, and the fifth driven gear 15. The first driven gear 11 and the second driven gear 12 are provided so as to be rotatable with respect to the transmission output shaft 43, and the third driven gear 13 the fourth driven gear 14 and the fifth driven gear 15 are secured to the transmission output shaft 43.

On the transmission output shaft 43, the speed sensor 33 is also provided as a detector of a shaft speed of the transmission output shaft 43.

Of the above gears, the first drive gear 1 and the first driven gear 11 mesh with the second drive gear 2 and the second driven gear 12, respectively. Also, the third drive gear 3 and the third driven gear 13 mesh with the fourth drive gear 4 and the fourth driven gear 14, respectively. In addition, the fifth drive gear 5 and the fifth driven gear 15 mesh with each other.

The first mesh transmission unit 21 is provided between the first driven gear 11 and the second driven gear 12. The first mesh transmission unit 21 engages the first driven gear 11 with the output shaft 43 or engages the second driven gear 12 therewith.

The torque that has been input to the input shaft 41, therefore, is transmitted to the first drive gear 1, the first driven gear 11, and the output shaft 43, in that order, or the second drive gear 2, the second driven gear 12, and the output shaft 43, in that order, via the first mesh transmission unit 21.

The second mesh transmission unit 22 is provided between the third drive gear 3 and the fourth drive gear 4. The second mesh transmission unit 22 engages the third drive gear 3 with the input shaft 41 or engages the fourth drive gear 4 therewith. The torque that has been input to the input shaft 41, therefore, is transmitted to the third drive gear 3, the third driven gear 13, and the output shaft 43, in that order, or the fourth drive gear 4, the fourth driven gear 14, and the output shaft 43, in that order, via the second mesh transmission unit 22.

The third mesh transmission unit 23 is provided next to the fifth drive gear 5. The third mesh transmission unit 23 engages the fifth drive gear 5 with the input shaft 41. The torque that has been input to the transmission input shaft 41, therefore, is transmitted to the fifth drive gear 5, the fifth driven gear 15, and the output shaft 43, in that order, via the third mesh transmission unit 23.

The mesh transmission units 21, 22, 23 here may each be of a normally meshed type or of a synchromesh type which has a friction transmission unit and presses a friction surface thereof to mesh associated movable elements in a speed-synchronous condition.

To transmit torque from the transmission input shaft 41 to the transmission output shaft 43 in this manner, either the first mesh transmission unit 21, the second mesh transmission unit 22, or the third mesh transmission unit 23 needs to be moved in an axial direction of the transmission input shaft 41 or of the transmission output shaft 43, thereby to be engaged with either the first driven gear 11, the second driven gear 12, the third drive gear 3, the fourth drive gear 4, or the fifth drive gear 5. A select actuator 63 is activated to actuate a shifter/selector 24 to select which of the three mesh transmission units, 21, 22, 23, is to be moved, and a shift actuator 62 is activated to actuate the shifter/selector 24 to move a position of the selected one of the three mesh transmission units, 21, 22, 23. After this, the selected mesh transmission unit is engaged with either the first driven gear 11, the second driven gear 12, the third drive gear 3, the fourth drive gear 4, or the fifth drive gear 5. The torque of the transmission input shaft 41 can thus be transmitted to the transmission output shaft 43 via either the first mesh transmission unit 21, the second mesh transmission unit 22, or the third mesh transmission unit 23.

The torque of the transmission input shaft 41 that has thus been transmitted from the first drive gear 1, the second drive gear 2, the third drive gear 3, the fourth drive gear 4, or the fifth drive gear 5, to the transmission output shaft 43 via the first driven gear 11, the second driven gear 12, the third driven gear 13, the fourth driven gear 14, or the fifth driven gear 15, is further transmitted to an axle (not shown) via a differential gear (not shown) connected to the transmission output shaft 43.

The input shaft clutch actuator 61, an actuator for controlling the transmission torque of the input shaft clutch 8, controls the transmission torque by controlling an electric current of an input shaft clutch actuator motor (not shown) via a transmission control unit 100 which is the controller. The input shaft clutch actuator 61 has a position sensor (not shown) that measures a stroke of the input shaft clutch.

Also, the transmission control unit 100 controls an electric current of a motor (not shown) provided on/in the select actuator 63. Thus, a stroke position (select position) of a control arm (not shown) provided on the shifter/selector 24 is controlled to select which of the three mesh transmission units, 21, 22, 23, is to be moved. The select actuator 63 has a position sensor (not shown) that measures the select position.

In addition, the transmission control unit 100 controls an electric current of a motor (not shown) provided on/in the shift actuator 62. Thus, rotational force of a control arm (not shown) provided on the shifter/selector 24, and a rotating position of the control arm are controlled. This allows control of a load or stroke position (shift position) at which either the first mesh transmission unit 21, second mesh transmission unit 22, or third mesh transmission unit 23 that has been selected by the select actuator 63. The shift actuator 62 has a position sensor (not shown) that measures the shift position.

The transmission 50 also has an oil temperature sensor (not shown) to measure a temperature of a lubricating oil inside the transmission 50.

The input shaft clutch 8 also has a temperature sensor (not shown) to measure a temperature of a friction surface of the input shaft clutch 8.

The select actuator 63 is controlled to control the select position, and moving the first mesh transmission unit 21 is selected. Also, the shift actuator 62 is controlled to control the shift position, and the first mesh transmission unit 21 and the first driven gear 11 mesh with each other. A first change gear position is thus established.

The select actuator 63 is controlled to control the select position, and moving the first mesh transmission unit 21 is selected. Also, the shift actuator 62 is controlled to control the shift position, and the first mesh transmission unit 21 and the second driven gear 12 mesh with each other. A second change gear position is thus established.

The select actuator 63 is controlled to control the select position, and moving the second mesh transmission unit 22 is selected. Also, the shift actuator 62 is controlled to control the shift position, and the second mesh transmission unit 22 and the third drive gear 3 mesh with each other. A third change gear position is thus established.

The select actuator 63 is controlled to control the select position, and moving the second mesh transmission unit 22 is selected. Also, the shift actuator 62 is controlled to control the shift position, and the second mesh transmission unit 22 and the fourth drive gear 4 mesh with each other. A fourth change gear position is thus established.

The select actuator 63 is controlled to control the select position, and moving the third mesh transmission unit 23 is selected. Also, the shift actuator 62 is controlled to control the shift position, and the third mesh transmission unit 23 and the fifth drive gear 5 mesh with each other. A fifth change gear position is thus established.

The shifter/selector 24 that operates the first mesh transmission unit 21, the second mesh transmission unit 22, and the third mesh transmission mechanism 23, may be constructed of a control shaft, a control arm, a shift fork, and/or other elements, or can likewise be constructed by using a drum unit or any other unit capable of moving the mesh transmission mechanisms 21, 22, 23.

A range position signal that indicates a position of a shift lever, such as range P, range R, range N, or range D, is input from a lever device 301 to the transmission control unit 100.

The transmission control unit 100 and the engine control unit 101 exchanges information with each other via a communications element 103.

Next, a construction of the friction transmission unit within the automatic transmission controlled by the motor vehicle transmission controller according to the present embodiment of the present invention will be described hereunder using FIG. 2.

Figure 2:
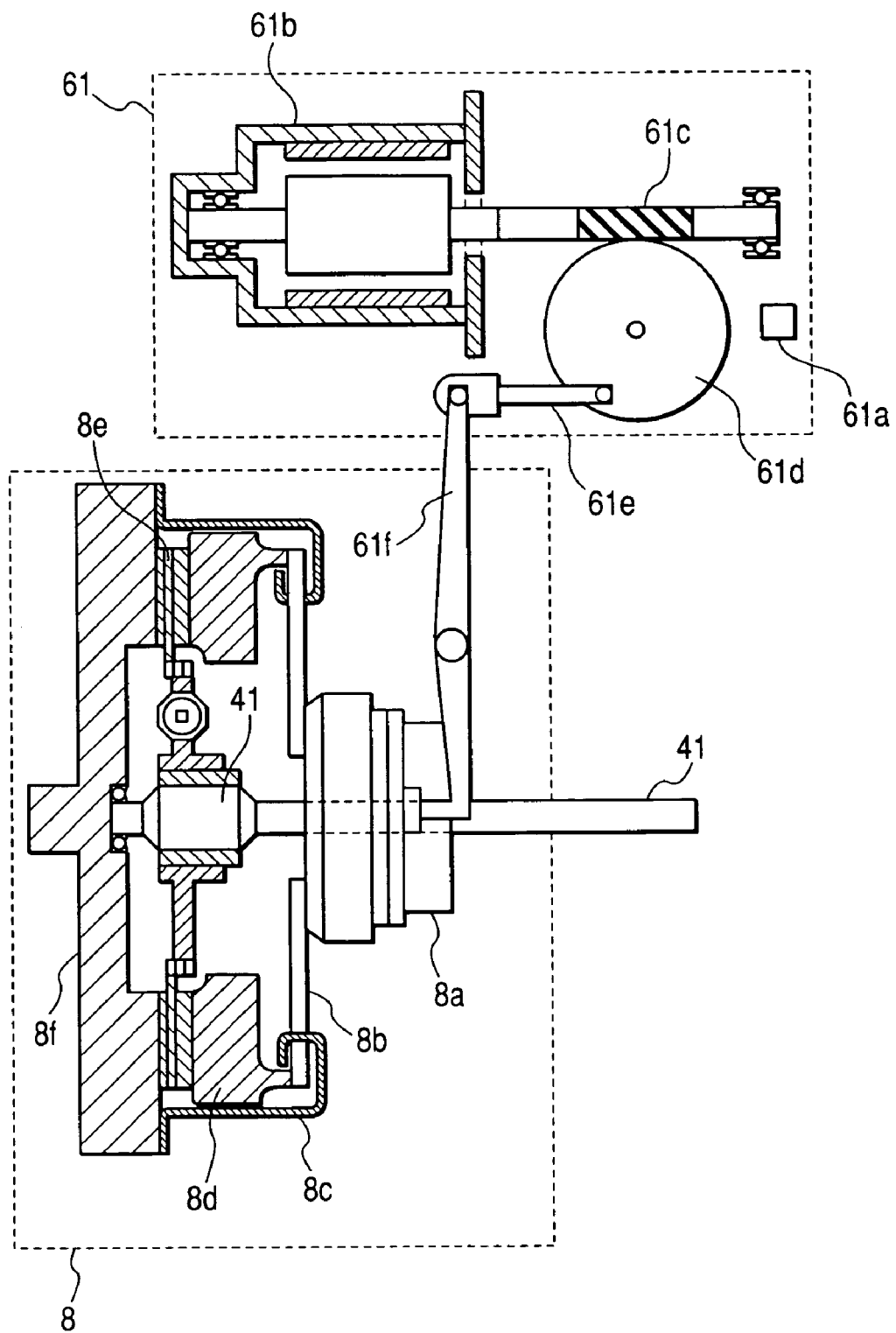
FIG. 2 is a partial sectional view showing a construction of a friction transmission unit provided in the automatic transmission controlled by the motor vehicle transmission controller according to the first embodiment of the present invention.

FIG. 2 is a partial sectional view showing the construction of the friction transmission unit within the automatic transmission controlled by the motor vehicle transmission controller according to the present embodiment of the present invention. FIG. 2 is an enlarged view selectively showing the input shaft clutch 8, input shaft clutch actuator 61, and transmission input shaft 41 of the friction transmission unit in FIG. 1.

The flywheel 8f shown in FIG. 2 is connected to the engine 7 of FIG. 1, and the torque of the engine 7 is input to the flywheel 8f. The flywheel 8f, a clutch cover 8c, a diaphragm spring 8b, and a pressure plate 8d are connected to one another and rotate together. Between the flywheel 8f and the transmission input shaft 41, a bearing is disposed to enable both of the two elements to rotate with each other. Between a release bearing 8a, the diaphragm spring 8b, and the transmission input shaft 41, another bearing is disposed to enable each of the three elements to rotate with one other.

The input shaft clutch actuator 61 shown in FIG. 2 has a clutch motor 61b, and the torque generated by the clutch motor 61b rotates a worm gear 61c. The rotation thereof rotates a worm wheel 61d, which then actuates a push rod 61e and hence a release fork 61f. The actuated release fork 61f actuates a release bearing 8a. When actuated, the release bearing 8a displaces the diaphragm spring 8b, actuates the pressure plate 8d, and exerts a pressure between the pressure plate 8d and a clutch disc 8e. Consequently, torque of the engine 7 (flywheel 8f) is transmitted to the transmission input shaft 41 via the clutch disc 8e.

The input shaft clutch actuator 61 has a position sensor 61a that measures a stroke of the input shaft clutch. The position sensor 61a in FIG. 2 detects a stroke of the pressure plate 8d via a rotational angle sensor which detects a rotational angle of the worm wheel 61d. Instead, the push rod 61e may have a stroke sensor to detect the above stroke, or the release fork 61f may have a rotational angle sensor via a linkage. In this way, it is possible to apply any type of sensor capable of detecting the stroke of the pressure plate 8d.

Next, a description will be given of an input/output signal relationship between the transmission control unit 100 and engine control unit 101 in the motor vehicle transmission controller according to the present embodiment.

Figure 3:
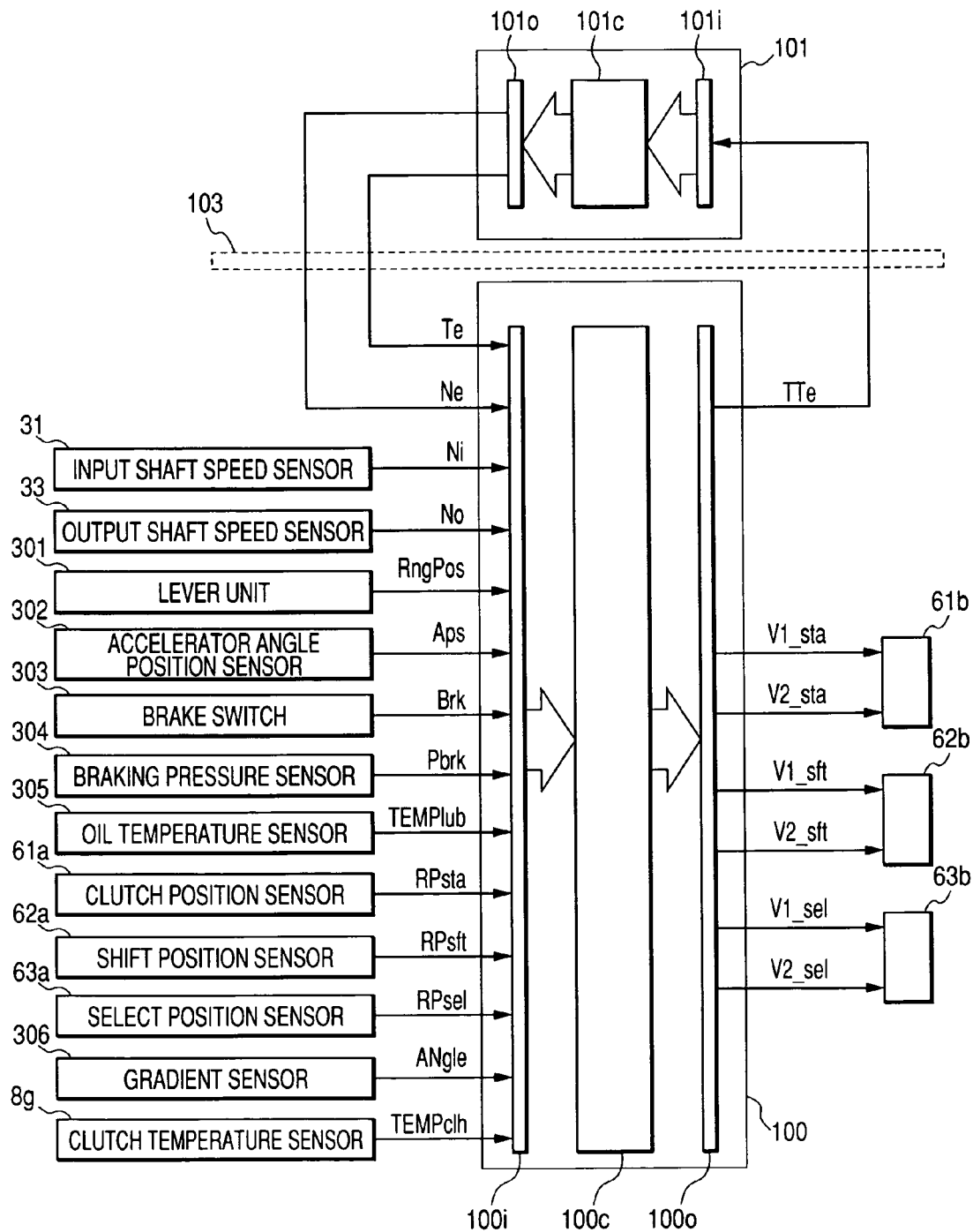
FIG. 3 is a block diagram showing the input/output signal relationship established between a transmission control unit and engine control unit in the motor vehicle transmission controller according to the first embodiment of the present invention.

FIG. 3 is a block diagram showing the input/output signal relationship between the transmission control unit 100 and engine control unit 101 in the motor vehicle transmission controller according to the first embodiment of the present invention.

The transmission control unit 100 is constructed as a control unit including an input section 100i, an output section 100o, and a computer 100c. Likewise, the engine control unit 101 is constructed as a control unit including an input section 101i, an output section 101o, and a computer 101c. An engine torque command value TTe is sent from the transmission control unit 100 to the engine control unit 101 via the communications element 103. In accordance with TTe, the engine control unit 101 controls the air intake rate, fuel quantity, ignition timing (not shown), and other factors of the engine 7. The engine control unit 101 also contains a detector (not shown) of the engine torque that works as input torque to the transmission. The detector detects, via the engine control unit 101, the speed of engine 7 (the number of revolutions, Ne), and the engine torque generated by the engine 7, and sends detection results to the transmission control unit 100 via the communications element 103. Alternatively, the engine torque detector may be a torque sensor or any other element capable of estimating the engine torque from engine parameters such as an injection pulse width of the fuel injector, an internal pressure of air intake tubing, or engine speed.

In order to achieve desired input shaft clutch transmission torque, the transmission control unit 100 adjusts the voltage V1_sta, V2_sta applied to the clutch motor 61b of the input shaft clutch actuator 61. Thus, the transmission control unit 100 controls an electric current of the clutch motor 61b and engages or disengages the input shaft clutch 8.

In order to achieve a desired select position, the transmission control unit 100 also adjusts the voltage V1_sel, V2_sel applied to the select motor 63b of the select actuator 63. Thus, the transmission control unit 100 controls an electric current of the select motor 63b and selects either the first mesh transmission unit 21, second mesh transmission unit 22, or third mesh transmission unit 23 to be meshed.

Additionally, in order to achieve a desired shift load or shift position, the transmission control unit 100 adjusts the voltage V1_sft, V2_sft applied to the shift motor 62b of the shift actuator 62. Thus, the transmission control unit 100 controls an electric current of the shift motor 62b and brings either the first mesh transmission unit 21, the second mesh transmission unit 22, or the third mesh transmission unit 23 into engagement or disengagement.

Furthermore, the transmission control unit 100 has a current detection circuit (not shown) to control torque values of each motor by changing an output voltage for the current of the motor to follow a desired current value.

The motors of each actuator are each constructed of a so-called a DC motor having a fixed magnet and coils rotated. These motors, however, may each be a so-called permanent magnet synchronous motor with fixed coils and a magnet rotated, or any other type of motor may be applicable.

An input shaft speed Ni and an output shaft speed No are input from the speed sensors 31 and 32, respectively, to the transmission control unit 100. Also, the range position signal Rng_Pos indicating a shift lever position such as range P, range R, range N, or range D, is input from the lever device 301 to the transmission control unit 100. In addition, an accelerator pedal stepping-on stroke signal Aps from an accelerator angle position sensor 302, an ON/OFF signal Brk from a brake switch 303 which detects whether a brake pedal is stepped on, and a braking pressure signal Pbrk from a sensor 304 of a brake oil pressure which regulates braking force are input to the transmission control unit 100.

A lubricating oil temperature signal TEMPlub from an oil temperature sensor 305 which measures the temperature of the lubricating oil within the transmission 50, and a clutch temperature signal TEMPclh from a temperature sensor 8g which measures the temperature of the friction surface of the input shaft clutch 8 are further input to the transmission control unit 100.

Furthermore, a road surface gradient signal Angle from a gradient sensor 306 for detecting a gradient of a road surface is input to the transmission control unit 100.

Besides, a clutch position signal RPsta that indicates the stroke of the input shaft clutch is input to the transmission control unit 100.

Moreover, a shift position signal RPsft that indicates a stroke position of either the first mesh transmission unit 21, the second mesh transmission unit 22, or the third mesh transmission unit 23, is input to the transmission control unit 100.

Moreover, a select position signal RPsel that indicates a stroke position of the control arm for selecting either the first mesh transmission unit 21, the second mesh transmission unit 22, or the third mesh transmission unit 23, is input to the transmission control unit 100.

For example, when a driver sets the shift lever to range D and steps on the accelerator pedal, the transmission control unit 100 judges that the driver intends to start or accelerate the vehicle. When the driver steps on the brake pedal, the transmission control unit 100 judges that the driver intends to stop or decelerate the vehicle. By judging in this way, the transmission control unit 100 sets an engine torque command value TTe and desired input shaft clutch transmission torque TTs in order to realize the driver's intention.

The transmission control unit 100 also sets a desired change gear position in response to the vehicle speed Vsp calculated from the output shaft speed No, and to an accelerator pedal stepping-on stroke Aps. In addition, the transmission control unit 100 sets the engine torque command value TTe, the desired input shaft clutch transmission torque TTs, a target shift position TPsft, a target shift load TFsft, and a target select position TPsel so as to conduct a shift change to the above-set change gear position.

Furthermore, in order to establish the above-set desired input shaft clutch transmission torque TTs, target shift position TPsft, target shift load TFsft, and target select position TPsel, the transmission control unit 100 outputs the voltages V1_sta, V2_sta, V1_sel, V2_sel, V1_sft, V2_sft applied to the clutch motor 61*b*, the shift motor 62*b*, and the select motor 63*b*.

While the input shaft clutch actuator 61, the shift actuator 62, and the select actuator 63 are each constructed as a motorized electric actuator in the present embodiment, each of the actuators may be a hydraulic (oil-pressure-driven) actuator with a hydraulic solenoid valve, a hydraulic piston, and a hydraulic cylinder.

Next, more specific control of the input shaft clutch 8 by the motor vehicle transmission controller according to the present embodiment will be described using FIGS. 4 to 7.

Figure 4:
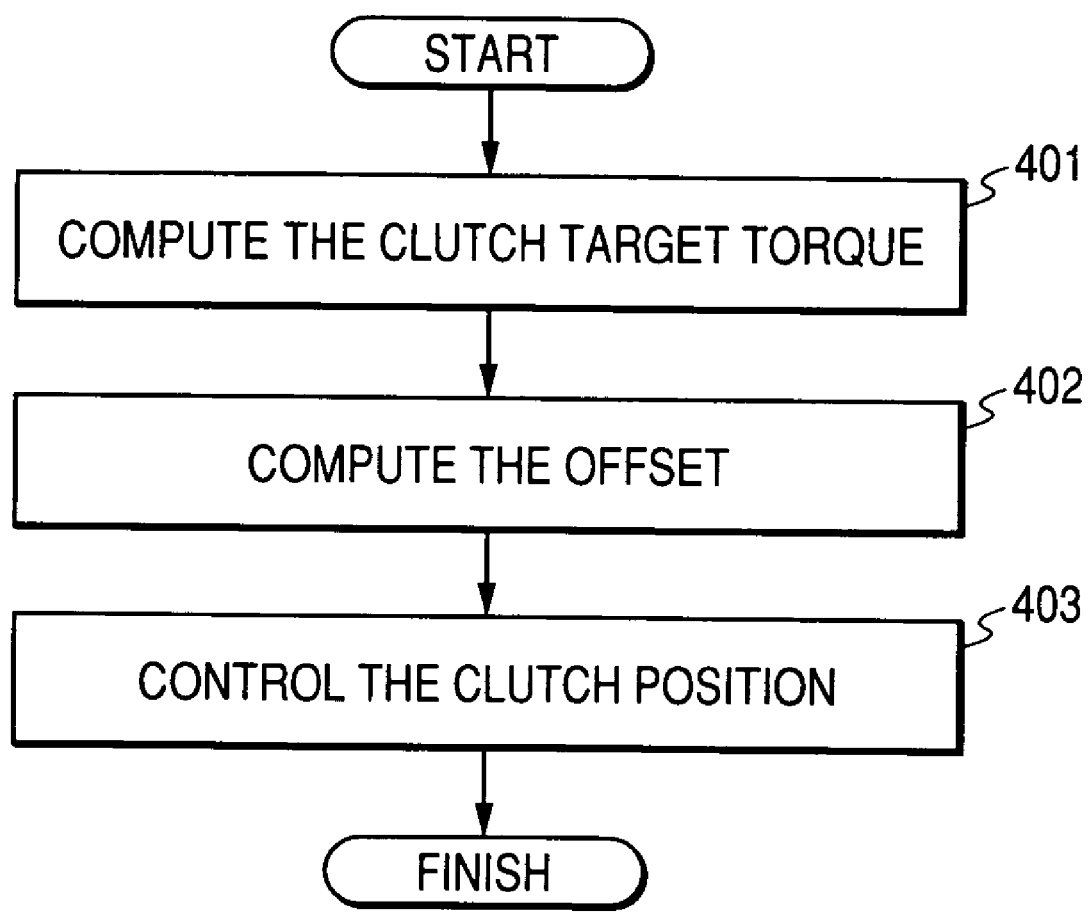
FIG. 4 is a schematic flowchart that shows control of an entire input shaft clutch by the controller for an automatic transmission according to the first embodiment of the present invention.

FIG. 4 is a schematic flowchart that shows control of the entire input shaft clutch by the controller for an automatic transmission according to the first embodiment of the present invention.

Process flow of shift change control includes step 401 (computing desired clutch torque), step 402 (computing offsets), and step 403 (controlling clutch position).

The control sequence shown in FIG. 4 is programmed in the computer 100*c* of the transmission control unit 100 and repeatedly executed at predefined periods. That is to say, the following steps 401 to 403 are executed by the transmission control unit 100.

In step 401 (computing desired clutch torque), depending on a particular operational state such as vehicle start or a shift change, the transmission control unit 100 sets the desired transmission torque TTs of the input shaft clutch 8 from the range position signal RngPos, the accelerator pedal stepping-on stroke Aps, the input shaft speed Ni, the output shaft speed No, the braking pressure Pbrk or the brake ON/OFF position Brk, and other factors.

Details of step 402 (computing offsets) will be later described using FIGS. 5 and 6. Details of step 403 (controlling clutch position) will be later described using FIG. 7.

Step 402 (computing offsets) shown in FIG. 4 is detailed below using FIGS. 5 and 6.

Figure 5:
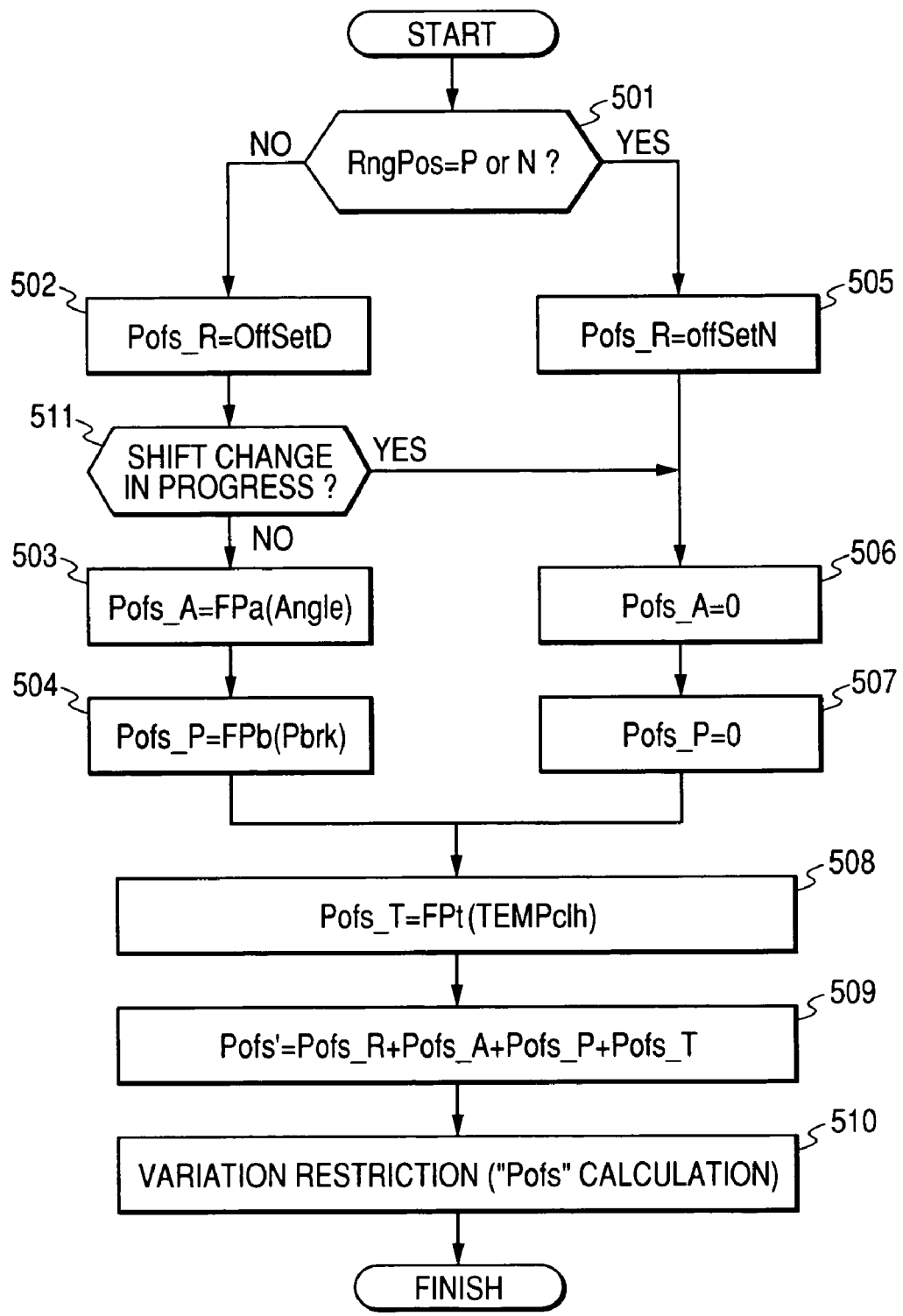
FIG. 5 is a flowchart that shows offset computation control, one of control items on the input shaft clutch controlled by the controller for an automatic transmission according to the first embodiment of the present invention.

FIG. 5 is a flowchart that shows offset computation control, one of control items on the input shaft clutch controlled by the controller for an automatic transmission according to the first embodiment of the present invention. FIG. 6 is an explanatory diagram of the functions used during offset computation, one of control items on the input shaft clutch controlled by the controller for an automatic transmission according to the first embodiment of the present invention. FIG. 6 (A) shows a function FPa that indicates the quantity of clutch position offset, Pofs_A, with respect to the road surface gradient Angle. FIG. 6 (B) shows a function FPb that indicates the quantity of clutch position offset, Pofs_P, with respect to the braking pressure Pbrk. FIG. 6 (C) shows a function FPt that indicates the quantity of clutch position offset, Pofs_T, with respect to the clutch temperature TEMPclh.

In step 501 of FIG. 5, the transmission control unit 100 judges whether the range position signal RngPos is indicative of a non-driving range (range P or N), and if the signal is indicative of the non-driving range (range P or N), advances control to step 505. If the signal is indicative of any other range, the transmission control unit 100 advances control to step 502.

If the signal is indicative of any other range, namely, a driving range such as range D, range 2, range 1, or range R, clutch position offset quantity Pofs_R based on range position signal RngPos is set to OffSetD in step 502. The OffSetD value here is desirably as small as possible (as close as possible to zero). If the signal is indicative of a driving range such as D, 2, 1, or R, the transmission control unit 100 may be adapted to have independent data settings for each range position, such as OffSetD and OffSet2. In so-called manual shift change mode, the independent data settings may be split even more strictly. In the driving ranges, the transmission control unit 100 may be further adapted to change the OffSetD value according to a particular change gear position such as a first-speed gear position or a second-speed gear position.

Next, whether a shift change is in progress is judged in step 511. Control is advanced to step 506 if a shift change is in progress, or to step 503 if a shift change is not in progress.

If a shift change is not in progress, clutch position offset quantity Pofs_A based on the road surface gradient is assigned in step 503 by means of the function FPa with the road surface gradient Angle as an input. The function FPa here is desirably set so that as shown in FIG. 6 (A), as the road surface gradient Angle (i.e., an angle of a slope) increases, clutch position offset quantity Pofs_A will decrease. Also, while the present embodiment uses the gradient sensor 306 to detect the road surface Angle, the detection may be by communication with a so-called navigation system that is a vehicle-mounted information device, or may be by estimation from a driving drag, vehicle acceleration, vehicle speed, or the like. In addition, the function FPa may be set so that as the road surface gradient Angle increases (i.e., as the upslope becomes steeper), clutch position offset quantity Pofs_A will change in a minus direction more significantly. In that case, however, processing is desirably conducted so that when control is changed over for step 506 to be executed as a result of the judgment in step 501, clutch position offset quantity Pofs_A will be gradually set to zero in step 506.

Next, in step 504, clutch position offset quantity Pofs_P based on the braking pressure is set by means of the function FPb with the braking pressure signal Pbrk as an input. The function FPb here is desirably set so that as shown in FIG. 6 (B), as the braking pressure Pbrk increases, clutch position offset quantity Pofs_P will increase. Also, while the braking pressure Pbrk that is a signal from the braking pressure sensor 304 is used to adjust the clutch position offset quantity Pofs_P in the present embodiment, the adjustment may be conducted using a sensor that detects the stepping-on force on the brake pedal. Additionally, when the vehicle has a mechanism such as a so-called electric brake, the transmission control unit 100 may be adapted to detect braking force using an output of a brake-operating unit. If the vehicle does not have a braking force detection sensor such as the braking pressure sensor or the brake-pedaling force sensor and receives only the ON/OFF signal Brk from the brake switch 303, the transmission control unit 100 may be adapted to dispense with execution of processing in steps 504 and 507. Instead, step 511 may be followed by, for example, a judgment based on the signal of the brake switch 303. In this case, by way of example, when the brake switch is in an ON state, step 506 is executed, and when the brake switch is in an OFF state, step 503 is executed. Further alternatively, the transmission control unit 100 can be constructed such that after step 511, a judgment step based on a side brake ON/OFF signal for judging whether a side brake is in an applied condition is conducted for the control unit 100 to execute step 506 if the side brake is in an ON state, or to execute step 503 if the side brake is in an OFF state.

Conversely, if the judgment in step 501 indicates that the shift lever is in a non-driving range (range P or range N)

position, clutch position offset quantity Pofs_R based on the range position signal is set to OffSetN in step 505. The OffSetN here is desirably a greater value than the OffSetD value. For example, the value obtained by adding a maximum value of the function FPa and that of the function FPb is set as the OffSetN value.

The above is followed by step 506, in which is then set to be zero the clutch position offset quantity Pofs_A based on the road surface gradient.

The above is followed by step 507, in which is then set to be zero the clutch position offset quantity Pofs_P based on the braking pressure.

Completion of processing in step 504 or 507 is followed by step 508, in which the clutch position offset quantity Pofs_T based on the clutch temperature is then set by means of the function FPt with the clutch temperature TEMPclh as an input. The function FPt here is desirably set so that as shown in FIG. 6 (C), as the clutch temperature TEMPclh increases above a required value, clutch position offset quantity Pofs_T will increase.

While the temperature sensor 8g for measuring the temperature of the friction surface of the input shaft clutch 8 is used to detect the clutch temperature in the present embodiment, this method may be replaced by any one of two alternative methods. A first alternative method is by measuring a clutch ambient temperature, estimating the temperature of the clutch friction surface, and calculating clutch position offset quantity Pofs_T by means of the function FPt. A second alternative method is by using a clutch ambient temperature and calculating clutch position offset quantity Pofs_T by means of the function FPt.

The above is followed by step 509. In this step, clutch position offset quantity Pofs_R based on the range position signal, clutch position offset quantity Pofs_A based on the road surface gradient, clutch position offset quantity Pofs_P based on the braking pressure, and clutch position offset quantity Pofs_T based on the clutch temperature are added to one another to calculate a basic offset quantity Pofs'.

Finally, in step 510, variation limits for each control period are added to the basic offset quantity Pofs', thereby to calculate a clutch position offset quantity Pofs. The variation limits here may be fixed values or may be calculated using an accelerator pedal angle position and/or other vehicle parameter functions. Instead of providing the variation limits, the accelerator pedal angle position and/or other vehicle parameters may otherwise be used to change a filtering time constant as first-order lag processing.

Details of step 403 (controlling clutch position) in FIG. 4 will be described using FIG. 7.

Figure 7:
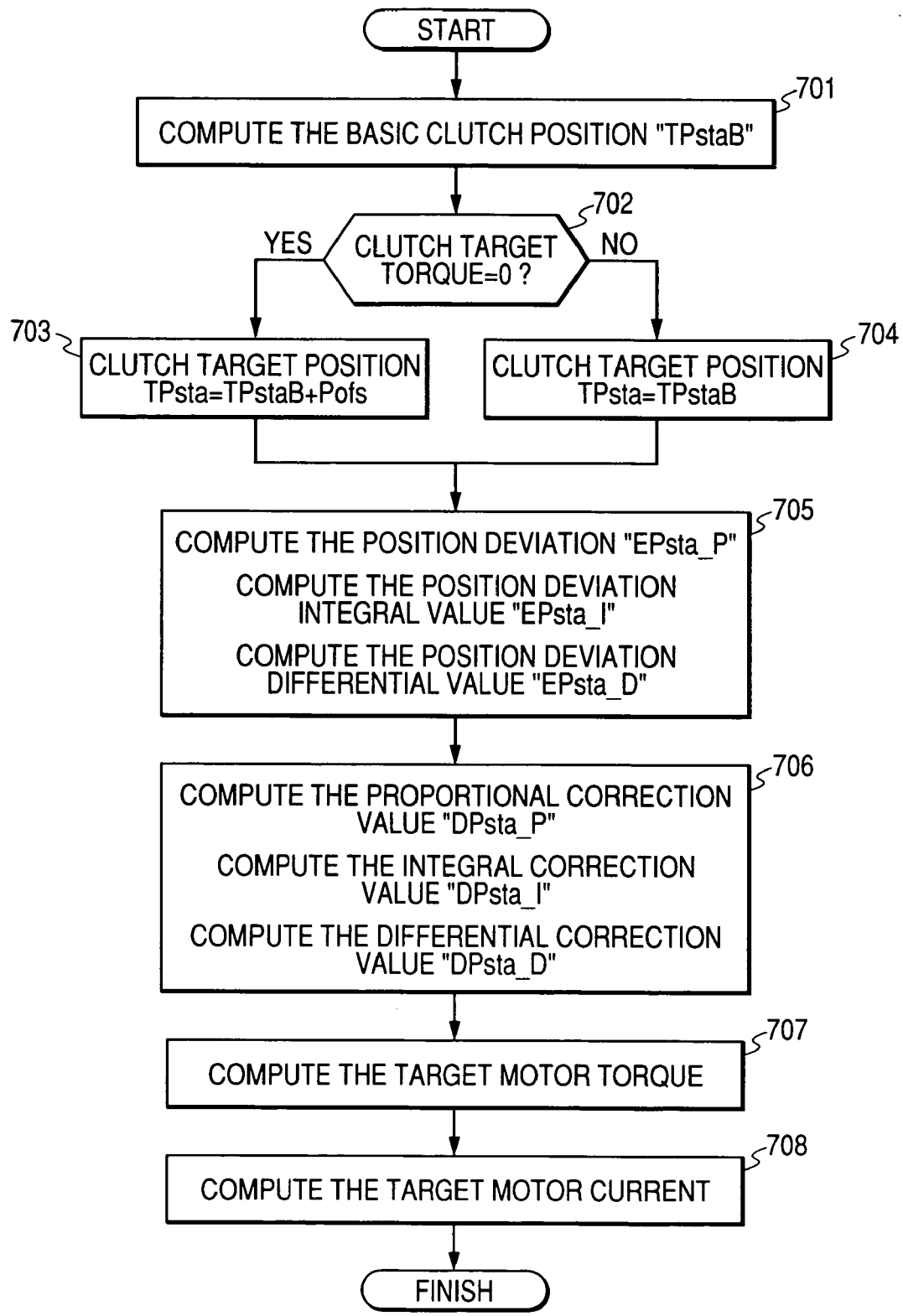
FIG. 7 is a flowchart that shows clutch position control, one of control items on the input shaft clutch controlled by the controller for an automatic transmission according to the first embodiment of the present invention.

FIG. 7 is a flowchart that shows clutch position control, one of control items on the input shaft clutch controlled by the controller for an automatic transmission according to the first embodiment of the, present invention.

In step 701, the transmission control unit 100 calculates a basic clutch position TPstaB to achieve the target transmission torque TTs that was calculated in step 401 of FIG. 4. The basic clutch position TPstaB is calculated from the target transmission torque TTs, a friction coefficient of the clutch, and/or other factors. The basic clutch position TPstaB is desirably corrected according to particular detection or estimation results on a friction state of the clutch. Additionally, an element that learns a clutch position at which zero clutch torque can be achieved is desirably provided for the basic clutch position TPstaB to be calculated from learningly corrected data to absorb differential device errors in clutch torque and in clutch position.

The above is followed by step 702, in which is then conducted a judgment of whether the target clutch transmission torque TTs is zero. If TTs is zero, control is advanced to step 703, or if TTs is not zero, control is advanced to step 704.

If the target clutch transmission torque TTs is zero, the transmission control unit 100 calculates the target clutch position TPsta in step 703 by adding the clutch offset quantity Pofs that was calculated in step 510 of FIG. 5, to the basic clutch position TPstaB that was calculated in step 701.

If the target clutch transmission torque TTs is not zero, the basic clutch position TPstaB that was calculated in step 701 is set as target clutch position TPsta in step 704.

Completion of processing in step 703 or 704 is followed by step 705, in which a position deviation EPsta_P, a position deviation integral value EPsta_I, and a position deviation differential value EPsta_D are then calculated from the target clutch position TPsta and the clutch position RPsta.

Next, a proportional correction value DPsta_P, an integral correction value DPsta_I, and a differential correction value DPsta_D are calculated in step 706.

Next, in step 707, the proportional correction value DPsta_P, the integral correction value DPsta_I, and the differential correction value DPsta_D are added and the resulting product is converted into target motor torque TMsta. The conversion here uses the coefficient set up from a reduction gear ratio, gear efficiency, and other factors of the worm gear shown in FIG. 2.

Finally, in step 708, the target motor torque TMsta is converted into a target motor current IMsta using a current conversion coefficient. The current conversion coefficient here is a coefficient set up according to particular clutch motor coil specifications and the quantity of interlinking field magnetic fluxes.

Examples of vehicle start control based on the control sequences shown in FIGS. 4 to 7 will be next described using FIGS. 8 to 11.

First, a first example of vehicle start control based on the sequences of FIGS. 4 to 7 is described below using FIG. 8. This first example of vehicle start control is concerned with the control sequence of a so-called creeping vehicle start that ranges from a range position signal level change from range N to range D, to a start of the vehicle. This example of vehicle start control assumes that the road surface gradient Angle is zero (flat surface).

Figure 8:
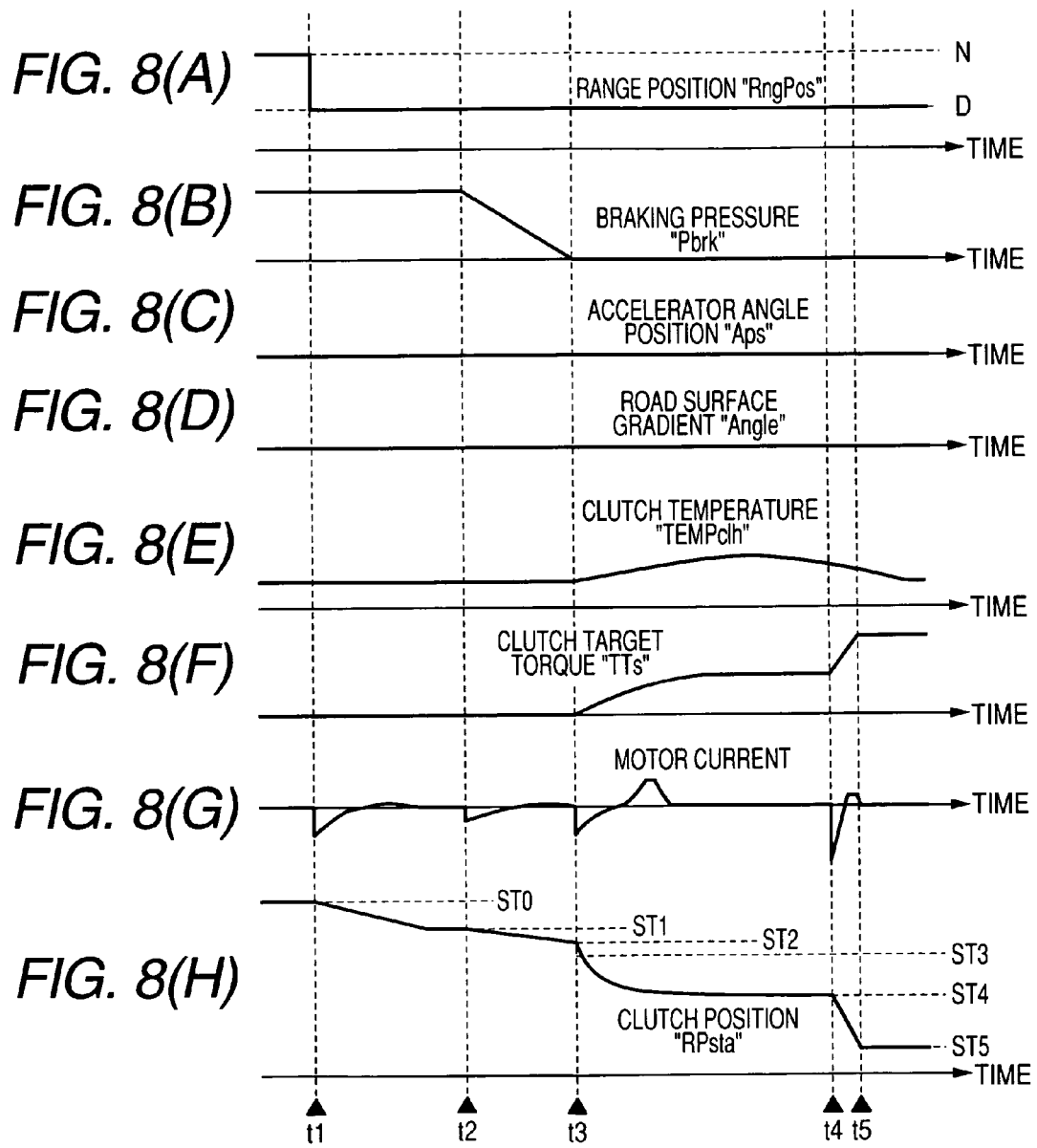
FIG. 8 is a timing chart showing a first example of vehicle start control by the controller for an automatic transmission according to the first embodiment of the present invention.

FIG. 8 is a timing chart showing the first example of vehicle start control by the controller for an automatic transmission according to the first embodiment of the present invention.

In FIG. 8, (A) indicates the range position signal RngPos. Symbol N denotes a signal level equivalent to range N, and symbol D denotes a position signal level equivalent to range D. FIG. 8 (B) indicates the braking pressure signal Pbrk. FIG. 8 (C) indicates the accelerator pedaling stroke (accelerator angle position) signal Aps. FIG. 8 (D) indicates the road surface gradient signal Angle. FIG. 8 (E) indicates the clutch temperature signal TEMPclh. FIG. 8 (F) indicates the target clutch torque signal TTs of the input shaft clutch 8. FIG. 8 (G) indicates a motor current signal of the clutch motor 61b, in which case, a minus sign of the motor current signal indicates a direction in which the input shaft clutch 8 is engaged, and a plus sign indicates a direction in which the input shaft clutch 8 is disengaged. FIG. 8 (H) indicates the clutch position signal RPsta (position of the pressure plate 8d), in which case, when the clutch position signal RPsta is at a position ST3 level or below, the clutch is transmitting torque, and when RPsta is at a position ST3 level or above, the clutch is in a disengaged condition. That is to say, the position ST3 level indicates a transmission starting position at which the torque transmitted by the clutch is exactly zero.

Since the transmission starting position ST3 of the clutch changes according to a particular wear state of the clutch, learning correction is desirably conducted: in step 701 of FIG. 7, namely, in the step of calculating the basic clutch position TPstaB.

Until time t1 has been reached, as shown in FIG. 8 (A), the range position signal RngPos indicates "N" (range N) and the braking pressure signal Pbrk is at a required level, so the vehicle is in a stopped state. At this time, as shown in FIG. 8 (H), the clutch position signal RPsta indicates that the clutch is in a standby state at a neutral position ST0, subject to the target clutch position signal TPsta that was calculated in FIGS. 5 and 7. A difference between the position ST3 and the neutral position ST0 during the standby state is equivalent to the offset quantity OffSetN in step 505 of FIG. 5.

As shown in FIG. 8 (A), at time t1, when range position signal RngPos level (A) changes from "N" (range N) to "D" (range D), steps 502, 503, 504 are executed in accordance with the judgment results that were obtained in step 501 of FIG. 5. As a result, each offset quantity is calculated from the data that was set in FIGS. 6 (A), (B), (C), and then in accordance with the variation limitation in step 510, the clutch position signal RPsta gently changes to a position ST1 level, as shown in FIG. 8 (H). The clutch thus stands by at an associated position.

Figure 6A:
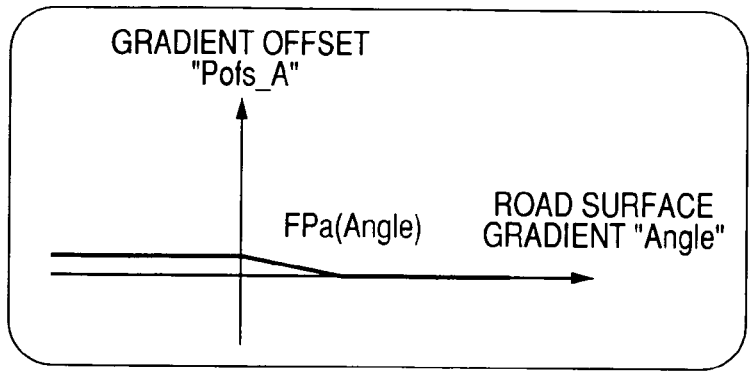
FIG. 6 is an explanatory diagram of the functions used during offset computation, one of control items on the input shaft clutch controlled by the controller for an automatic transmission according to the first embodiment of the present invention.
Figure 6B:
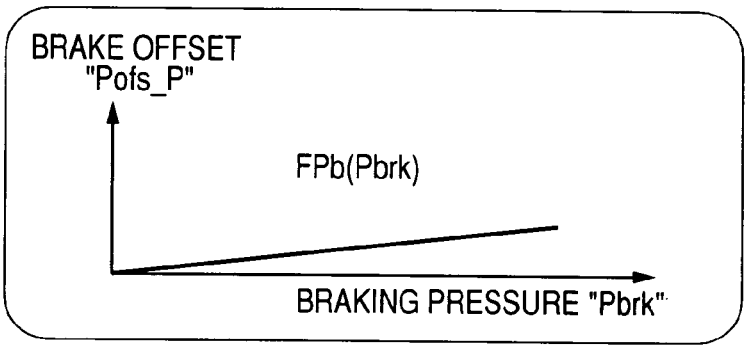
Figure 6C:
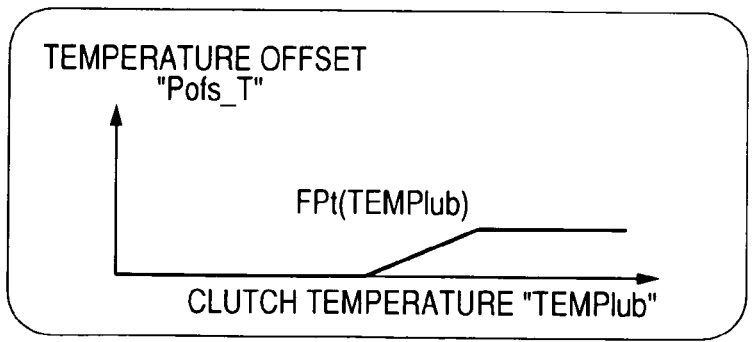

As shown in FIG. 8 (B), during a period from time t2 to time t3, when the vehicle driver loosens his/her brake pedaling and the braking pressure Pbrk gradually approaches zero, the clutch position offset quantity Pofs_P subject to the braking pressure, calculated in step 504 of FIG. 5, gradually changes to zero in accordance with the data settings in FIG. 6 (B). Consequently, the clutch position signal RPsta gently changes to a position ST2 level as shown in FIG. 8 (H). In other words, the standby position signal level of the clutch changes from ST1 to ST2.

At time t3, when the braking pressure Pbrk becomes zero as shown in FIG. 8 (B), step 401 in FIG. 4 is executed to judge that the brake has been released, and the vehicle starts creeping. In step 401 of FIG. 4, the input shaft clutch target torque TTs required for creeping is calculated, and as shown in FIG. 8 (F), TTs progressively rises from zero. As the input shaft clutch target torque TTs shown in FIG. 8 (F) changes, the basic clutch position TPstaB is correspondingly calculated in step 701 of FIG. 7, and as shown in FIG. 8 (H), the clutch position signal RPsta gradually changes to a position ST4 level, at which the vehicle stars propulsion.

During a period from time t4 to time t5, as shown in FIG. 8 (F), the input shaft clutch target torque TTs required for creeping is calculated in step 401 of FIG. 4 and TTs increases to a maximum torque capacity. Consequently, as the input shaft clutch target torque TTs changes, the basic clutch position TPstaB is calculated in step 701 of FIG. 7, and as shown in FIG. 8 (H), the clutch position signal RPsta changes to a fully engaging position ST5 level. Control is thus completed.

In the stopped state of the vehicle during the period from time t1 to time t3 as described above, since the clutch offset quantity Pofs defined in FIG. 5 changes in response to the range position signal RngPos and the braking pressure Pbrk, the standby position signal level of the clutch position signal RPsta, shown in FIG. 8 (H), changes from ST0 to ST2. When creeping at time t3 is started, a response speed at which the clutch position signal RPsta reaches the transmission starting position signal level ST3 is increased, which makes it possible to realize a rapid start of creeping and thus to avoid a decrease in driving performance due to a delay in response during a start of creeping.

Next, a second example of vehicle start control based on the sequences of FIGS. 4 to 7 is described below using FIG. 9. This second example of vehicle start control, as with the first example of vehicle start control, is concerned with the control sequence of a so-called creeping vehicle start that ranges from a range position signal level change from range N to range D, to a start of the vehicle. This example of vehicle start control, however, assumes a plus road surface gradient Angle (upslope).

Figure 9:
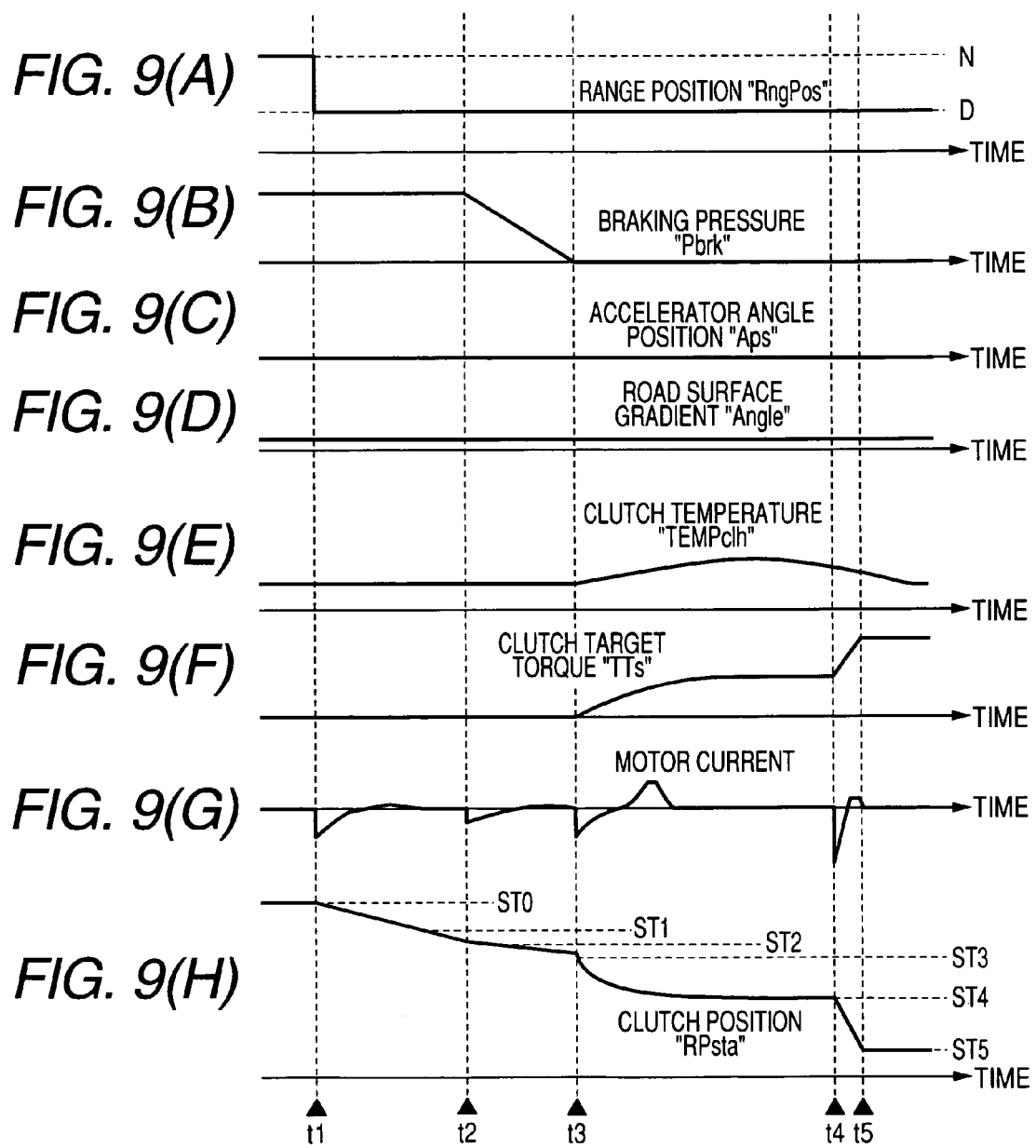
FIG. 9 is a timing chart showing a second example of vehicle start control by the controller for an automatic transmission according to the first embodiment of the present invention.

FIG. 9 is a timing chart showing the second example of vehicle start control by the controller for an automatic transmission according to the first embodiment of the present invention.

The time shown on a horizontal axis in FIG. 9 is the same as in FIG. 8. Also, meanings of (A) to (H) in FIG. 9 are the same as those of (A) to (H) in FIG. 8.

Processing at up to time t1 is the same as in FIG. 8. As shown in FIG. 9 (A), the range position signal RngPos indicates "N" (range N) and the braking pressure signal Pbrk is at a required level, so the vehicle is in a stopped state. At this time, as shown in FIG. 9 (H), the clutch position signal RPsta indicates that the clutch is in a standby state at a neutral position ST0, subject to the target clutch position signal TPsta that was calculated in FIGS. 5 and 7.

As shown in FIG. 9 (A), at time t1, when the range position signal RngPos level changes from "N" (range N) to "D" (range D), steps 502, 503, 504 are executed in accordance with the judgment results that were obtained in step 501 of FIG. 5. In FIG. 9, since the road surface gradient signal Angle indicates a plus value as shown in 9 (D), the clutch position offset quantity Pofs_A based on the road surface gradient is set to be smaller than in FIG. 8, subject to the data settings in FIG. 6 (A), and in accordance with the variation limitation in step 510, the clutch position signal RPsta gently changes to a level near a position ST2, as shown in FIG. 9 (H). The clutch thus stands by at an associated position.

As shown in FIG. 9 (B), during a period from time t2 to time t3, when the braking pressure Pbrk gradually approaches zero, the clutch position offset quantity Pofs_P subject to the braking pressure, calculated in step 504 of FIG. 5, gradually changes to zero in accordance with the data settings in FIG. 6 (B). As shown in FIG. 9 (H), therefore, the clutch position signal RPsta gently changes from nearly the ST2 position to nearly a transmission starting position ST3. In other words, the standby position signal level of the clutch changes from nearly ST2 to nearly ST3.

At time t3, when the braking pressure Pbrk becomes zero as shown in FIG. 9 (B), step 401 in FIG. 4 is executed to judge that the brake has been released, and the vehicle starts creeping. In step 401 of FIG. 4, the input shaft clutch target torque TTs required for creeping is calculated, and as shown in FIG. 9 (F), TTs progressively rises from zero. As the input shaft clutch target torque TTs changes, the basic clutch position TPstaB is correspondingly calculated in step 701 of FIG. 7, and as shown in FIG. 9 (H), the clutch position signal RPsta gradually changes to a position ST4 level, at which the vehicle stars propulsion.

During a period from time t4 to time t5, as shown in FIG. 9 (F), the input shaft clutch target torque TTs required for creeping is calculated in step 401 of FIG. 4 and TTs increases to a maximum torque capacity. As the input shaft clutch target torque TTs changes, the basic clutch position TPstaB is correspondingly calculated in step 701 of FIG. 7, and as shown in FIG. 9 (H), the clutch position signal RPsta changes to a fully engaging position ST5 level. Control is thus completed.

In the stopped state of the vehicle during the period from time t1 to time t3 as described above, since the clutch offset quantity Pofs defined in FIG. 5 changes in response to the range position signal RngPos, the road surface gradient Angle, and the braking pressure Pbrk, the standby position signal level of the clutch position signal RPsta, shown in FIG. 9 (H), changes from ST0 to nearly ST3. When creeping at time t3 is started, a response speed at which the clutch position signal RPsta reaches the transmission starting position signal level ST3 is further increased, which makes it possible to realize a more rapid start of creeping and thus to avoid decreases in driving performance due to a delay in creeping start response or due to the occurrence of rollback.

In this example, if the function FPa in FIG. 6 (A) is set so that the clutch position offset quantity Pofs_A changes more significantly in a minus direction with an increase in road surface gradient Angle, that is, if FPs is set to fit a particular upslope, torque transmission by the input shaft clutch 8 can be started before the braking pressure Pbrk becomes zero at time t3 in FIG. 9. Such start of torque transmission further accelerates the response during the start of creeping and avoids the occurrence of rollback as well.

Next, a third example of vehicle start control based on the sequences of FIGS. 4 to 7 is described below using FIG. 10. This third example of vehicle start control, as with the first and second examples of vehicle start control, is concerned with the control sequence of a so-called creeping vehicle start that ranges from a range position signal level change from range N to range D, to a start of the vehicle. This example of vehicle start control, however, assumes that the clutch temperature TEMPclh is high.

Figure 10:
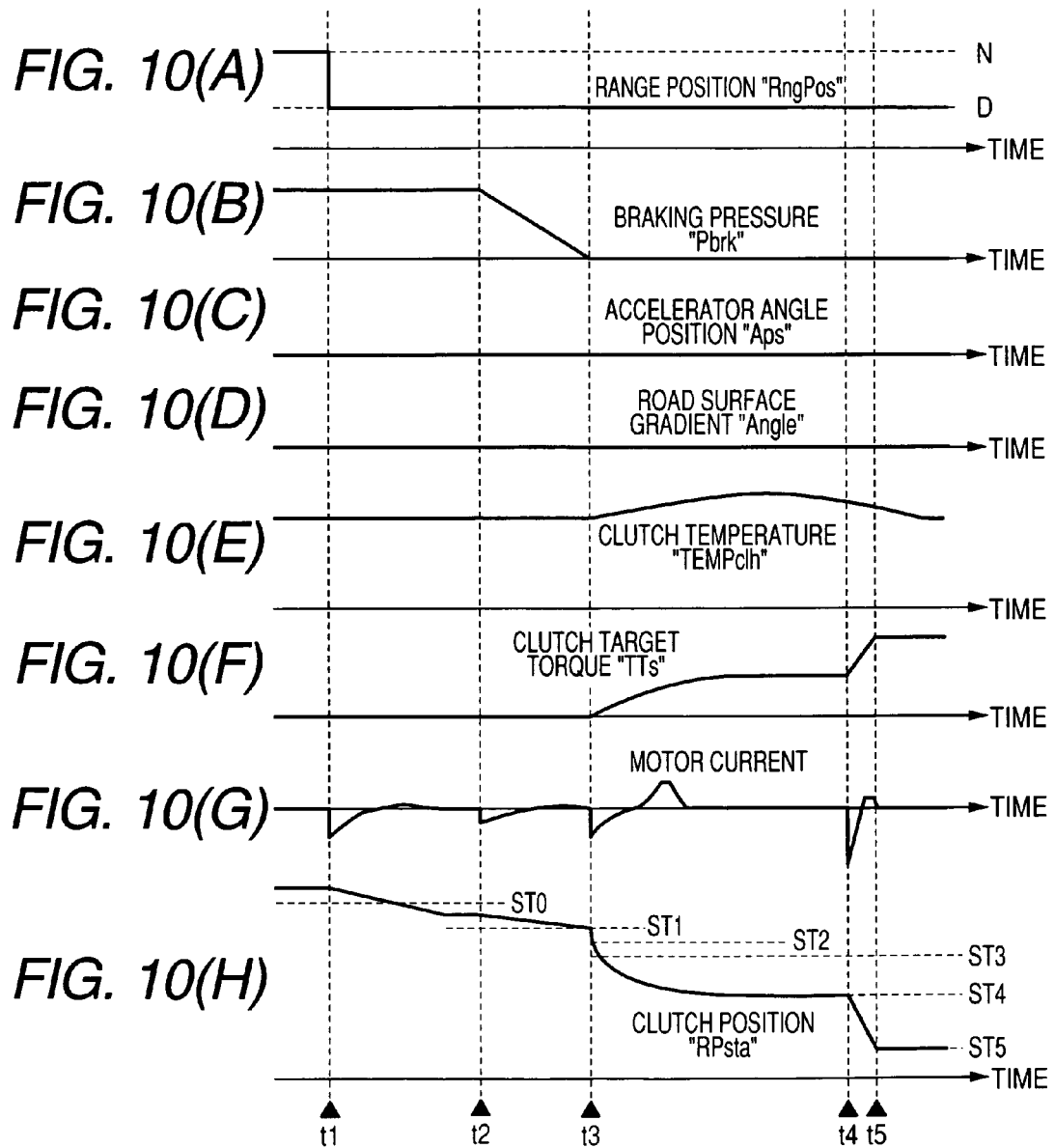
FIG. 10 is a timing chart showing a third example of vehicle start control by the controller for an automatic transmission according to the first embodiment of the present invention.

FIG. 10 is a timing chart showing the third example of vehicle start control by the controller for an automatic transmission according to the first embodiment of the present invention.

The time shown on a horizontal axis in FIG. 10 is the same as in FIG. 8. Also, meanings of (A) to (H) in FIG. 10 are the same as those of (A) to (H) in FIG. 8.

Processing at up to time t1 is the same as in FIG. 8. As shown in FIG. 10 (A), the range position signal RngPos indicates "N" (range N) and the braking pressure signal Pbrk is at a required level, so the vehicle is in a stopped state. Also, as shown in FIG. 10 (E), the clutch temperature TEMPclh is high. At this time, as shown in FIG. 10 (H), the clutch position signal RPsta indicates that the clutch is in a standby position closer to a releasing position than at a neutral position ST0, subject to the target clutch position signal TPsta that was calculated in FIGS. 5 and 7. A difference between the standby position and position ST3 is equivalent to the added value of the offset quantity OffSetN in step 505 of FIG. 5 and the clutch position offset quantity Pofs_P subject to the clutch temperature of FIG. 5. The clutch position offset quantity Pofs_T subject to the clutch temperature that was calculated in step 508 of FIG. 5 is calculated in accordance with the settings in FIG. 6 (C), so the offset quantity in FIG. 10 is set to be greater than in FIGS. 8, 9.

As shown in FIG. 10 (A), at time t1, when the range position signal RngPos level changes from "N" (range N) to "D" (range D), steps 502, 503, 504 are executed in accordance with the judgment results that were obtained in step 501 of FIG. 5. Each offset quantity is calculated in accordance with the data settings in FIGS. 6 (A), (B), (C), and in accordance with the variation limitation in step 510, the clutch position signal RPsta gently changes to nearly a middle level between positions ST0 and ST1, as shown in FIG. 10 (H). The clutch thus stands by at an associated position.

As shown in FIG. 10 (B), during a period from time t2 to time t3, when the braking pressure Pbrk gradually approaches zero, the clutch position offset quantity Pofs_P subject to the braking pressure, calculated in step 504 of FIG. 5, gradually changes to zero in accordance with the data settings in FIG. 6 (B). As shown in FIG. 10 (H), therefore, the clutch position signal RPsta gently changes to nearly the position ST1. In other words, the standby position signal level of the clutch changes from nearly a middle position between positions ST0 and ST1 to nearly ST1.

At time t3, when the braking pressure Pbrk becomes zero as shown in FIG. 10 (B), step 401 in FIG. 4 is executed to judge that the brake has been released, and the vehicle starts creeping. In step 401 of FIG. 4, the input shaft clutch target torque TTs required for creeping is calculated, and as shown in FIG. 10 (F), TTs progressively rises from zero. As the input shaft clutch target torque TTs changes, the basic clutch position TPstaB is correspondingly calculated in step 701 of FIG. 7, and as shown in FIG. 10 (H), the clutch position signal RPsta gradually changes to a position ST4 level, at which the vehicle stars propulsion.

During a period from time t4 to time t5, as shown in FIG. 10 (F), input shaft clutch target torque TTs increases to a maximum torque capacity. As the input shaft clutch target torque TTs changes, the basic clutch position TPstaB is correspondingly calculated in step 701 of FIG. 7, and as shown in FIG. 10 (H), the clutch position signal RPsta changes to a fully engaging position ST5 level. Control is thus completed.

In the stopped state of the vehicle during the period from time t1 to time t3 as described above, depending on the clutch temperature TEMPclh, the clutch offset quantity Pofs defined in FIG. 5 is set to be greater than in FIGS. 8, 9. As a result, even if the transmission starting position ST3 of the clutch varies, generating a larger amount of clutch heat than necessary can be avoided at high clutch temperature.

The examples shown in FIGS. 8 to 10 assume that at up to time t1, that is, when the range position is N, the clutch position RPsta is at ST0. This position, however, can be ST1. Thus, the response during the start of creeping can be further accelerated.

Next, a first example of shift change control based on the sequences of FIGS. 4 to 7 is described below using FIG. 11. This first example of shift change control relates to the control sequence of an upshift from a first-speed gear position to a second-speed gear position.

Figure 11:
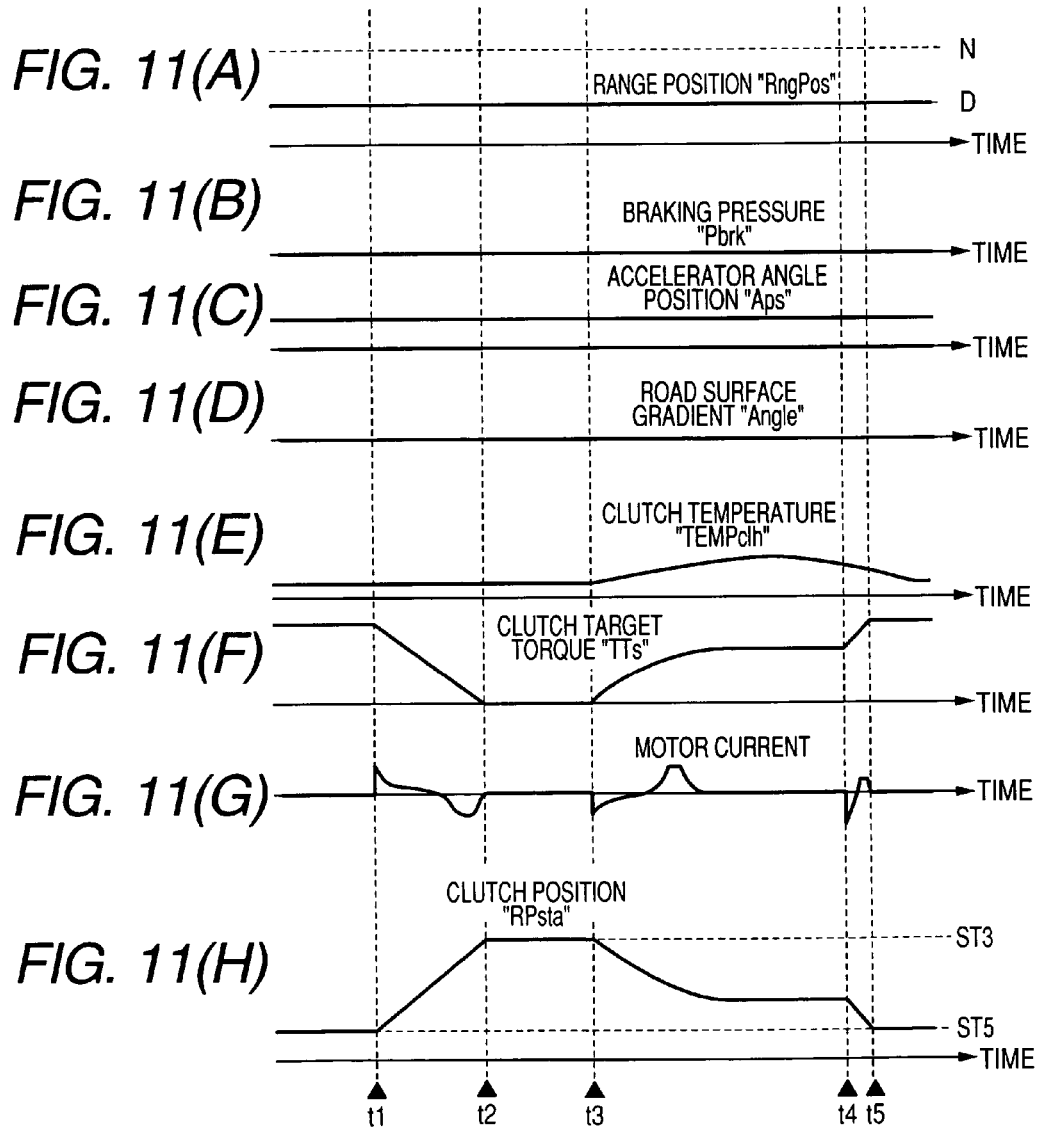
FIG. 11 is a timing chart showing a first example of shift change control by the controller for an automatic transmission according to the first embodiment of the present invention.

FIG. 11 is a timing chart showing the first example of shift change control by the controller for an automatic transmission according to the first embodiment of the present invention.

The time shown on a horizontal axis in FIG. 11 is the same as in FIG. 8. Also, meanings of (A) to (H) in FIG. 11 are the same as those of (A) to (H) in FIG. 8.

As shown in FIG. 11, the range position signal RngPos indicates "D" (range D), the braking pressure signal Pbrk is of a zero level, and the accelerator angle position signal Aps is maintained at a fixed value.

Until time t1 has been reached, as shown in FIG. 11 (F), input shaft clutch target torque TTs is maintained at a maximum torque capacity. As a result, in accordance with the target clutch position TPsta that was calculated in FIG. 7, the clutch position signal RPsta is maintained at a fully engaging position level ST5 as shown in FIG. 11 (H).

At time t1, when a shift change is started, the input shaft clutch target torque TTs gradually approaches zero after execution of step 401 in FIG. 4. This zero state is shown in FIG. 11 (F). As a result, in accordance with the target clutch position TPsta calculated in FIG. 7, the clutch position signal RPsta gently changes to a transmission starting position level ST3 as shown in FIG. 11 (H).

During a period from time t2 to time t3, the first mesh transmission unit 21 of FIG. 1, previously meshed with the first driven gear 11, is changed from the first-speed gear position to the second-speed gear position and meshed with the second driven gear 12. At this time, in accordance with the judgment results that were obtained in step 501 of FIG. 5 and in step 511, steps 502, 506, 507 are executed to calculate each offset quantity. At this time, both the basic offset quantity Pofs' calculated in step 509 of FIG. 5, and the clutch offset quantity Pofs calculated in step 510 become zero, and consequently as shown in FIG. 11 (H), the clutch position signal RPsta changes to the transmission starting position level ST3, whereby the clutch stands by at an associated position.

After confirmation of the fact, at time t3, that the first mesh transmission unit 21 in FIG. 1 has meshed with the second driven gear 12, the input shaft clutch target torque TTs required for the shift change is calculated in step 401 of FIG. 4 during a period from time t3 to time t4. The input shaft clutch target torque TTs then gradually rises from zero, as shown in FIG. 11 (F). As the input shaft clutch target torque TTs changes, the basic clutch position TPstaB is correspondingly calculated in step 701 of FIG. 7, and as shown in FIG. 11 (H), the clutch position signal RPsta gradually changes.

After confirmation of the fact, at time t4, that a speed difference of the input shaft clutch 8 has sufficiently decreased, the input shaft clutch target torque TTs rises to the maximum torque capacity in step 401 of FIG. 4, as shown in FIG. 11 (F). As the input shaft clutch target torque TTs changes, the basic clutch position TPstaB is correspondingly calculated in step 701 of FIG. 7, and as shown in FIG. 11 (H), the clutch position signal RPsta changes to the fully engaging position level ST5. This change completes control at time t5.

During the period from time t2 to time t3, when as described above, the first mesh transmission unit 21 of FIG. 1, previously meshed with the first driven gear 11, is changed from the first-speed gear position to the second-speed gear position and meshed with the second driven gear 12, the clutch offset quantity Pofs defined in FIG. 5 is set to be zero in response to the range position signal RngPos and the shift change state. As a result, the standby position signal level of the clutch position signal RPsta, shown in FIG. 11 (H), changes to the transmission starting position level ST3. Thus, at time t3, when engagement of the input shaft clutch 8 is started, the clutch position signal RPsta changes from the transmission starting position signal level ST3. This change makes it possible to realize a rapid rise of the transmission torque by the input shaft clutch 8 and thus to avoid a decrease in driving performance due to a delay in the rise of the transmission torque by the input shaft clutch 8.

Next, a construction and operation of a controller for a motor vehicle gear-type transmission according to a second embodiment of the present invention will be described hereunder using FIGS. 12 to 23.

First, a configuration of an vehicle with the automatic transmission that is controlled by the controller for a motor vehicle gear-type transmission according to the second embodiment is described below using FIG. 12.

Figure 12:
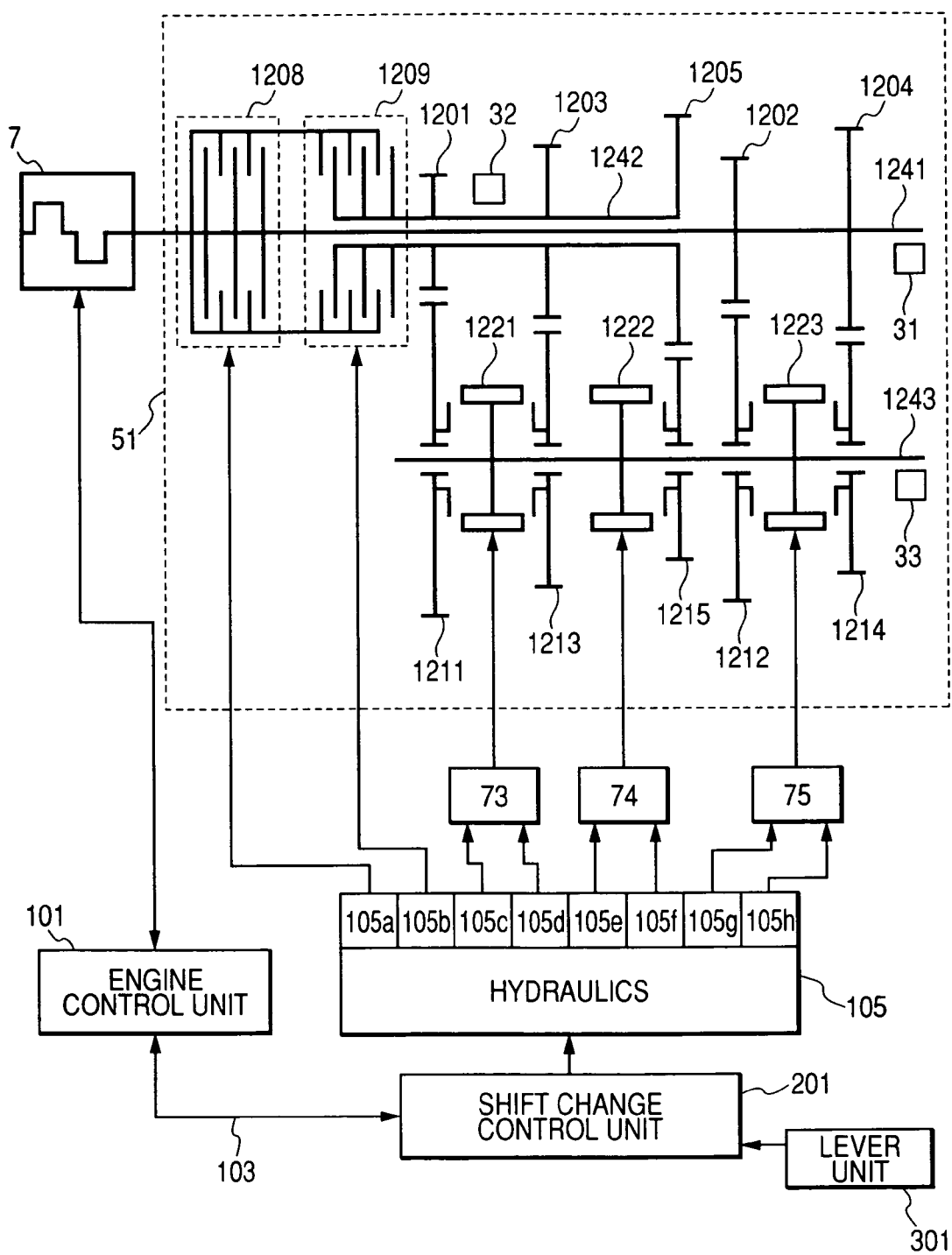
FIG. 12 is a skeleton diagram showing a system configuration of a vehicle which has an automatic transmission controlled by a motor vehicle transmission controller according to a second embodiment of the present invention.

FIG. 12 is a skeleton diagram showing a system configuration of the vehicle with the automatic transmission controlled by the controller for a motor vehicle gear-type transmission according to the second embodiment of the present invention. The same reference numbers and symbols as those of FIG. 1 denote the same sections.

Automatic transmission 51 includes a first clutch 1208, a second clutch 1209, a first input shaft 1241, a second input shaft 1242, an output shaft 1243, a first drive gear 1201, a second drive gear 1202, a third drive gear 1203, a fourth drive gear 1204, a fifth drive gear 1205, a first driven gear 1211, a second driven gear 1212, a third driven gear 1213, a fourth driven gear 1214, a fifth driven gear 1215, a first mesh transmission unit 1221, a second mesh transmission unit 1222, a third mesh transmission unit 1223, and speed sensors 31, 32, and 33.

This example of construction differs from the constructional example of FIG. 1 in that whereas the latter constructional example uses the engagement of the input shaft clutch 8 to transmit the torque of the engine 7 to the transmission input shaft 41, the former constructional example employs a twin-clutch arrangement.

That is to say, engagement of the first clutch 1208 transmits torque of an engine 7 to the first input shaft 1241, and engagement of the second clutch 1209 transmits the torque of the engine 7 to the second input shaft 1242. The second input shaft 1242 is hollow, and the first input shaft 1241 is adapted to extend through a hollow section of the second input shaft 1242 so as to be movable in a relative fashion with respect to a rotational direction of the second input shaft 1242.

The first drive gear 1201, the third drive gear 1203, and the fifth drive gear 1205 are secured to the second input shaft 1242, and these drive gears are rotatable with respect to the first input shaft 1241. Also, the second drive gear 1202 and the fourth drive gear 1204 are secured to the first input shaft 1241, and both drive gears are rotatable with respect to the second input shaft 1242.

The first clutch 1208 is engaged and disengaged using the oil pressure controlled by a solenoid valve 105a, and the second clutch 1209 is engaged and disengaged using the oil pressure controlled by a solenoid valve 105b.

The sensor 31 is provided as a device to detect the number of rotations (shaft speed) of the first input shaft 1241, and the sensor 32 is provided as a device to detect the number of rotations (shaft speed) of the second input shaft 1242.

The output shaft 1243 has the first driven gear 1211, the second driven gear 1212, the third driven gear 1213, the fourth driven gear 1214, and the fifth driven gear 1215. The five driven gears are each rotatable with respect to the output shaft 43.

The sensor 33 is provided as a device to detect the number of rotations (shaft speed) of the output shaft 1243.

Between the first driven gear 1211 and the third driven gear 1213 is provided the first mesh transmission unit 1221 that engages the first driven gear 1211 with the output shaft 1243 or engages the third driven gear 1213 therewith.

Between the second driven gear 1212 and the fourth driven gear 1214 is provided the third mesh transmission unit 1223 that engages the second driven gear 1212 with the output shaft 1243 or engages the fourth driven gear 1214 therewith.

The second mesh transmission unit 1222 that engages the fifth driven gear 1215 with the output shaft 1243 is provided at the fifth driven gear 1215.

Each of the mesh transmission units 1221, 1222, 1223 here is desirably of a synchromesh type which has a friction transmission unit and presses a friction surface thereof to mesh associated movable elements in a speed-synchronous condition.

Activating a shift actuator 73 changes a position of the first mesh transmission unit 1221 and engages the transmission unit 1221 with the first driven gear 1211 or the third driven gear 1213. Torque of the second input shaft 1242 can thus be transmitted to the output shaft 1243 via the first mesh transmission unit 1221.

Also, activating a shift actuator 75 changes a position of the third mesh transmission unit 1223 and engages the transmission unit 1223 with the second driven gear 1212 or the fourth driven gear 1214. Torque of the second input shaft 1242 can thus be transmitted to the output shaft 1243 via the third mesh transmission unit 1223.

In addition, activating a shift actuator 74 changes a position of the second mesh transmission unit 1222 and engages the transmission unit 1222 with the fifth driven gear 1215. Torque of the second input shaft 1242 can thus be transmitted to the output shaft 1243 via the second mesh transmission unit 1222.

A transmission control unit 201 that is the controller controls an electric current of the solenoid valve 105*a* provided in on a hydraulic unit 105. Consequently, a pressure plate 1208*c* (shown in FIG. 13) provided in the first clutch 1208 is controlled, whereby transmission torque of the first clutch 1208 is controlled. In other words, the hydraulic unit 105 and the solenoid valve 105*a* are constructed as an actuator that actuates the first clutch 1208.

The transmission control unit 201 also controls an electric current of the solenoid valve 105*b* provided in/on the hydraulic unit 105. Consequently, a pressure plate 1209*c* (shown in FIG. 13) provided in the second clutch 1209 is controlled, whereby transmission torque of the second clutch 1209 is controlled. In other words, the hydraulic unit 105 and the solenoid valve 105*b* are constructed as an actuator that actuates the second clutch 1209.

In addition, the transmission control unit 201 controls an electric current of a solenoid valve 105*c*, 105*d* provided in/on the hydraulic unit 105. Thus, a load or stroke position (first shift position) of the first mesh transmission unit 1221 can be controlled via a hydraulic piston (not shown) provided in the shift actuator 73. The shift actuator 73 has a position sensor (not shown) to measure the first shift position.

Furthermore, the transmission control unit 201 controls an electric current of a solenoid valve 105*e*, 105*f* provided in/on the hydraulic unit 105. Thus, a load or stroke position (second shift position) of the second mesh transmission unit 1222 can be controlled via a hydraulic piston (not shown) provided in the shift actuator 74. The shift actuator 74 has a position sensor (not shown) to measure the second shift position.

Moreover, the transmission control unit 201 controls an electric current of a solenoid valve 105*g*, 105*h* provided in/on the hydraulic unit 105. Thus, a load or stroke position (third shift position) of the third mesh transmission unit 1223 can be controlled via a hydraulic piston (not shown) provided in the shift actuator 75. The shift actuator 75 has a position sensor (not shown) to measure the third shift position.

The transmission 51 has an oil temperature sensor (not shown) to measure a temperature of a lubricating oil within the transmission 51. The lubricating oil temperature sensor is desirably provided in a cooling flow path of the clutch (i.e., in a flow path disposed in immediate front of a starting position of clutch cooling).

An oil temperature sensor (not shown) for measuring a temperature of a lubricating oil present around the first clutch 1208 and/or the second clutch 1209 is also provided to indirectly measure a temperature of a friction surface of the first clutch 1208/second clutch 1209.

In addition, a range position signal that indicates a shift lever position such as range P, range R, range N, or range D is input from a lever device 301 to the transmission control unit 201.

The transmission control unit 201 and the engine control unit 101 exchange information with each other via a communications element 103.

Next, a construction of the friction transmission unit within the automatic transmission controlled by the motor vehicle transmission controller according to the present embodiment will be described hereunder using FIG. 13.

Figure 13:
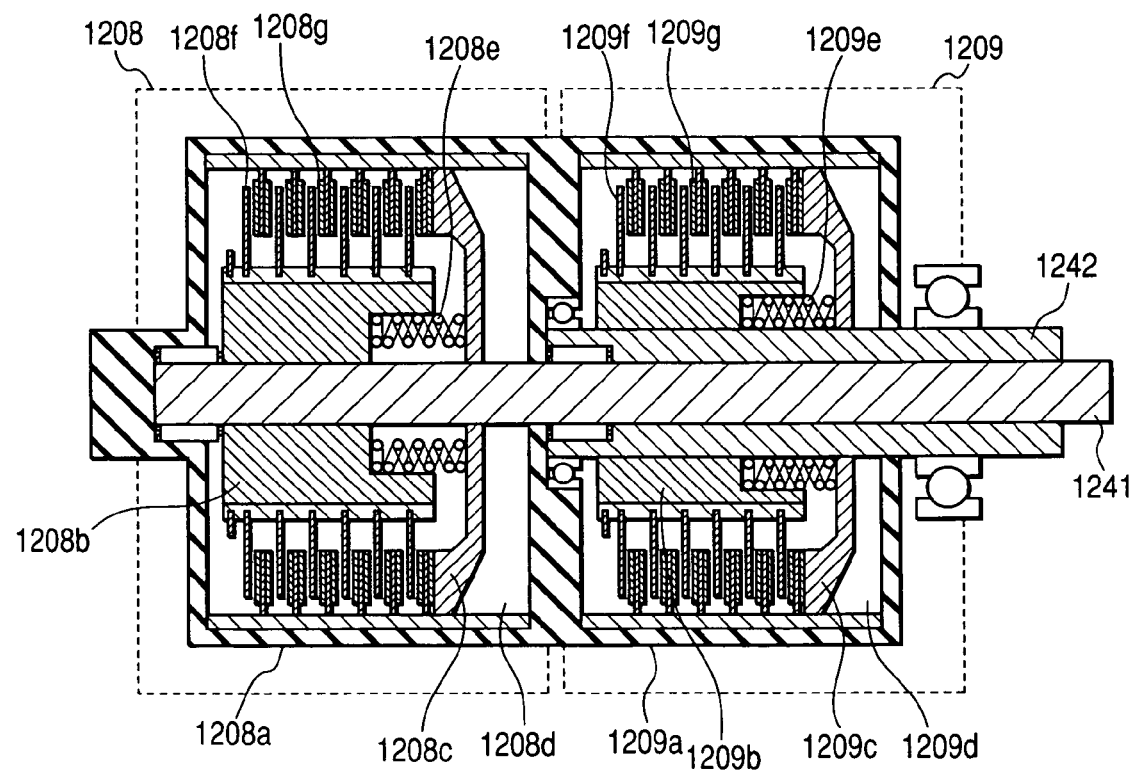
FIG. 13 is a partial sectional view showing a construction of a friction transmission unit provided in the automatic transmission controlled by the motor vehicle transmission controller according to the second embodiment of the present invention.

FIG. 13 is a partial sectional view showing the construction of the friction transmission unit within the automatic transmission controlled by the motor vehicle transmission controller according to the present second embodiment of the present invention. FIG. 13 is an enlarged view selectively showing the first clutch 1208, second clutch 1209, first input shaft 1241, and second input shaft 1242) of the friction transmission unit in FIG. 12. The same reference numbers or symbols as those of FIG. 12 denote the same sections.

The clutch drum 1208*a* and engine 7 shown in FIG. 13 are connected to each other, and the clutch drum 1208*a*, the first input shaft 1241, and the second input shaft 1242 are rotatable with respect to one another. Also, the first input shaft 1241 and the second input shaft 1242 are rotatable with respect to each other.

The first input shaft 1241, a clutch hub 1208*b*, the pressure plate 1208*c*, a return spring 1208*e*, and a clutch plate 1208*f* rotate together, and the second input shaft 1242, a clutch hub 1209*b*, the pressure plate 1209*c*, a return spring 1209*e*, and a clutch plate 1209*f* rotate together.

In addition, the clutch drum 1208*a*, a clutch disc 1208*g*, and a clutch disc 1209*g* rotate together.

In the first clutch 1208 of FIG. 13, an oil pressure that has been regulated by the solenoid valve 105*a* of FIG. 12 is supplied to an oil compartment 1208*d* via a hydraulic pipeline (not shown). An increase in the internal oil pressure of the oil compartment 1208*d* presses the pressure plate 1208*c*, which then compresses the return spring 1208*e* and exerts a pressure between the clutch plate 1208*f* and the clutch disc 1208*g*. Thus, torque of the engine 7 is transmitted to the first input shaft 1241 via the clutch drum 1208*a*, the clutch disc 1208*g*, the clutch plate 1208*f*, and the clutch hub 1208*b*, in that order.

Similarly, in the second clutch 1209 of FIG. 13, an oil pressure that has been regulated by the solenoid valve 105*b* of FIG. 12 is supplied to an oil compartment 1209*d* via a hydraulic pipeline (not shown). An increase in the internal oil pressure of the oil compartment 1209*d* presses the pressure plate 1209*c*, which then compresses the return spring 1209*e* and exerts a pressure between the clutch plate 1209*f* and the clutch disc 1209*g*. Thus, torque of the engine 7 is transmitted to the second input shaft 1242 via the clutch drum 1209*a*, the clutch disc 1209*g*, the clutch plate 1209*f*, and the clutch hub 1209*b*, in that order.

While the first clutch 1208 and second clutch 1209 that are friction transmission units are constructed as a wet-type multi-disc clutch in the present embodiment, the first and second clutches may be constructed as a dry-type single-disc clutch and can be applied to various types of friction transmission units adapted to transmit power by-applying a pressure to the friction surface.

Next, a description will be given of an input/output signal relationship between the transmission control unit 201 and engine control unit 101 in the motor vehicle transmission controller according to the present embodiment.

Figure 14:
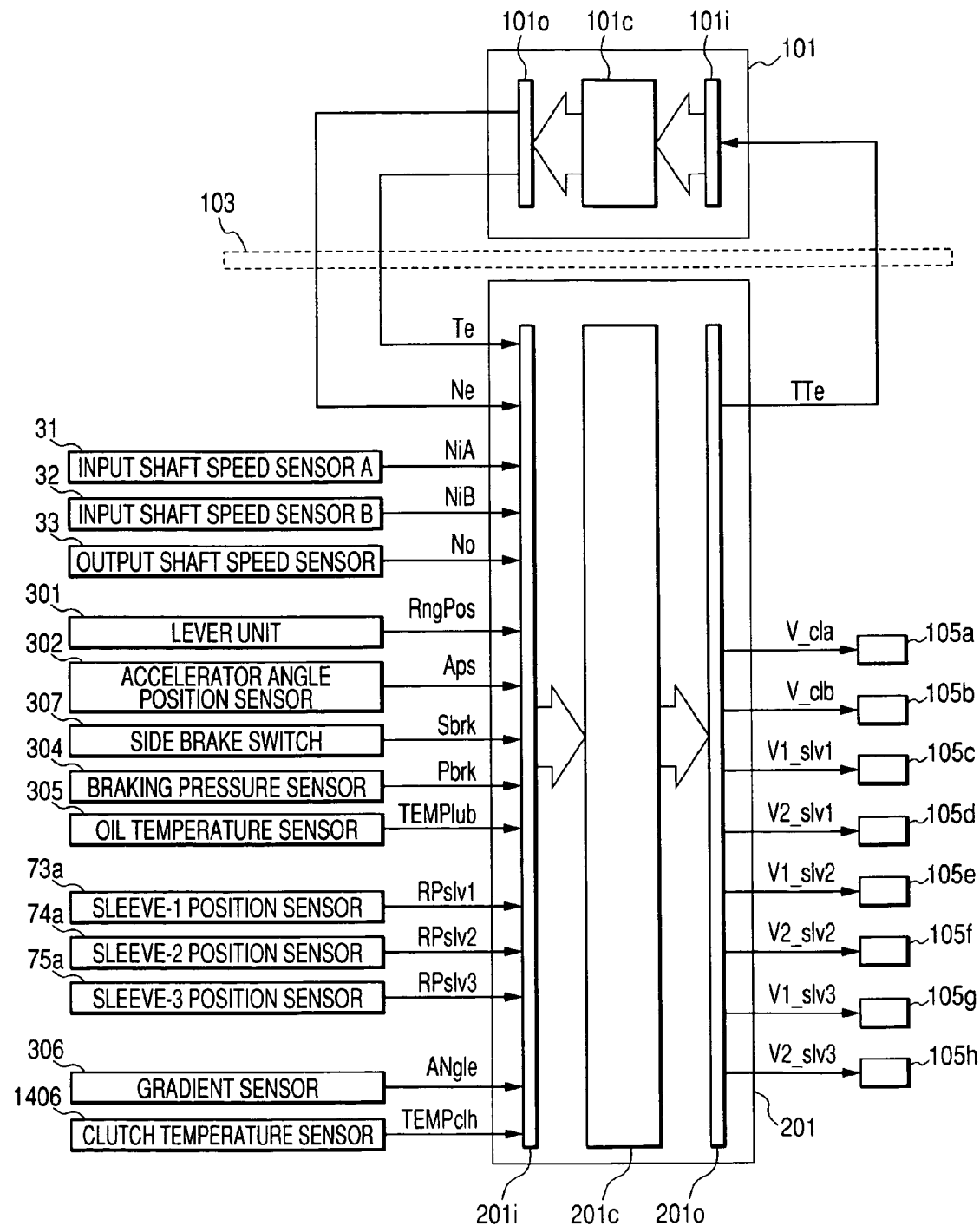
FIG. 14 is a block diagram showing the input/output signal relationship established between a transmission control unit and engine control unit in the motor vehicle transmission controller according to the second embodiment of the present invention.

FIG. 14 is a block diagram showing the input/output signal relationship between the transmission control unit and engine control unit in the motor vehicle transmission controller according to the present second embodiment of the present invention.

The transmission control unit 201 is constructed as a control unit including an input section 201i, an output section 201o, and a computer 201c. Likewise, the engine control unit 101 is constructed as a control unit including an input section 101i, an output section 101o, and a computer 101c. An engine torque command value TTe is sent from the transmission control unit 201 to the engine control unit 101 via a communications element 103. In accordance with TTe, the engine control unit 101 controls an air intake rate, fuel quantity, ignition timing (not shown), and other factors of the engine 7. The engine control unit 101 also contains a detector (not shown) of the engine torque that works as input torque to the transmission. The detector detects, via the engine control unit 101, engine speed (the number of revolutions, Ne) of, and the engine torque generated by the engine 7, and sends detection results to the transmission control unit 201 via the communications element 103. Alternatively, the engine torque detector may be a torque sensor or any other element capable of estimating the engine torque from engine parameters such as an injection pulse width of a fuel injector, an internal pressure of air intake tubing, or engine speed.

In order to achieve desired first clutch transmission torque, the transmission control unit 201 adjusts the voltage V_cla applied to the solenoid valve 105a. Thus, the transmission control unit 201 controls an electric current of the solenoid valve 105a and engages or disengages the first clutch 1208.

In order to achieve desired second clutch transmission torque, the transmission control unit 201 adjusts the voltage V_clb applied to the solenoid valve 105b. Thus, the transmission control unit 201 controls an electric current of the solenoid valve 105b and engages or disengages the second clutch 1209.

In order to achieve a desired position of the first mesh transmission unit 1221, the transmission control unit 201 also adjusts the voltage V1_slv1, V2_slv1 applied to the solenoid valve 105c, 105d. Thus, the transmission control unit 201 controls an electric current of the solenoid valve 105c, 105d and engages or disengages the first mesh transmission unit 1221.

In order to achieve a desired position of the second mesh transmission unit 1222, the transmission control unit 201 also adjusts the voltage V1_slv2, V2_slv2 applied to the solenoid valve 105e, 105f. Thus, the transmission control unit 201 controls an electric current of the solenoid valve 105e, 105f and engages or disengages the second mesh transmission unit 1222.

In addition, in order to achieve a desired position of the third mesh transmission unit 1223, the transmission control unit 201 adjusts the voltage V1_slv3, V2_slv3 applied to the solenoid valve 105g, 105h. Thus, the transmission control unit 201 controls an electric current of the solenoid valve 105g, 105h and engages or disengages the third mesh transmission unit 1223.

Furthermore, the transmission control unit 201 has a current detection circuit (not shown) to control electric current of each solenoid valve by changing an output voltage for the current of the solenoid valve to follow a desired current value.

A first input shaft speed NiA, a second input shaft speed NiB, and an output shaft speed No are input from the speed sensors 31, 32, and 33, respectively, to the transmission control unit 201. Also, the range position signal Rng_Pos indicating a shift lever position such as range P, range R, range N, or range D, is input from the lever device 301 to the transmission control unit 201. In addition, an accelerator pedal stepping-on stroke signal Aps from an accelerator angle position sensor 302, an ON/OFF signal Sbrk from a side brake switch 307 which detects whether a side brake is applied, and a braking pressure signal Pbrk from a sensor 304 of a brake oil pressure which regulates braking force are input to the transmission control unit 201.

A lubricating oil temperature signal TEMPlub from an oil temperature sensor 305 which measures the temperature of the lubricating oil within the transmission 51, and a clutch temperature signal TEMPclh from a temperature sensor 1406 which measures the temperature of the friction surface of the first clutch 1208/second clutch 1209 are further input to the transmission control unit 201.

Additionally, a road surface gradient signal Angle from a gradient sensor 306 for detecting a gradient of a road surface is input to the transmission control unit 201.

Furthermore, a sleeve-1 position signal RPslv1, a sleeve-2 position signal RPslv2, and a sleeve-3 position signal RPslv3, each sent from a sleeve-1 position sensor 73a, a sleeve-2 position sensor 74a, and a sleeve-3 position sensor 75a, respectively, are input to the transmission control unit 201. The three types of position sensor signals indicate the respective stroke positions of the first mesh transmission unit 1221, the second mesh transmission unit 1222, and the third transmission unit 1223.

For example, when a driver sets a shift lever to range D and steps on the accelerator pedal, the transmission control unit 201 judges that the driver intends to start or accelerate the vehicle. When the driver steps on the brake pedal, the transmission control unit 201 judges that the driver intends to stop or decelerate the vehicle. By judging in this way, the transmission control unit 201 sets the engine torque command value TTe and desired second clutch transmission torque TTs2 (or desired first clutch transmission torque TTs1) in order to realize the driver's intention.

The transmission control unit 201 also sets a desired change gear position in response to the vehicle speed Vsp calculated from the output shaft speed No, and to an accelerator pedal stepping-on stroke Aps. In addition, the transmission control unit 201 sets the engine torque command value TTe, the desired first clutch transmission torque TTs1, the desired second clutch transmission torque TTs2, a desired sleeve-1 position signal TPslv1, a desired sleeve-2 position signal TPslv2, and a desired sleeve-3 position signal TPslv3. A shift change to the above-set change gear position is conducted in this way.

Furthermore, in order to establish the above-set desired first clutch transmission torque TTs1, desired second clutch transmission torque TTs2, desired sleeve-1 position signal RPslv1, desired sleeve-2 position signal TPslv2, and desired sleeve-3 position signal TPslv3, the transmission control unit 201 outputs the voltages V_cla, V_clb, V1_slv1, V2_slv1, V1_slv2, V2_slv2, V1_slv3, V2_slv3 applied to the solenoid valves 105a, 105b, 105c, 105d, 105e, 105f, 105g, 105h, respectively.

Next, more specific control of the second clutch 1209 by the motor vehicle transmission controller according to the present embodiment will be described using FIGS. 15 to 20.

The control process sequences shown in FIGS. 15 to 20 relate to the clutch used during vehicle engine, and for normal vehicle start at a first speed, this clutch corresponds to the second clutch 1209 in the example described below. Control sequences equivalent to those of FIGS. 15 to 20 can also be applied to second-speed vehicle start by being conducted for the first clutch 1208.

Figure 15:
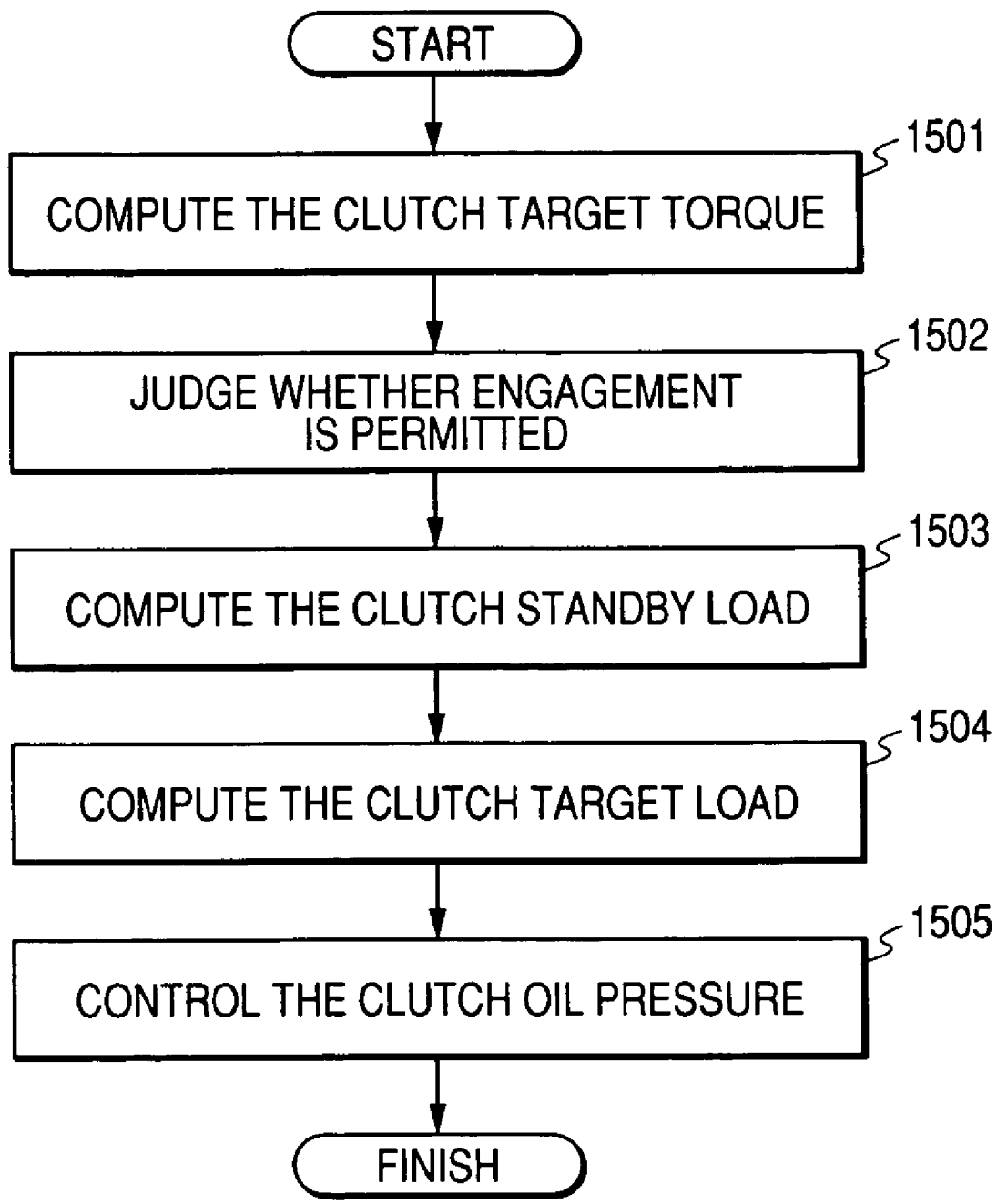
FIG. 15 is a schematic flowchart showing a control sequence of an entire second shaft clutch by the controller for an automatic transmission according to the second embodiment of the present invention.

FIG. 15 is a schematic flowchart showing a control sequence of the entire second shaft clutch by the controller for an automatic transmission according to the second embodiment of the present invention.

Process flow of shift change control includes step 1501 (computing desired clutch torque), step 1502 (judging engagement permission), step 1503 ((computing a clutch standby load), step 1504 (computing a desired clutch load), and step 1505 (controlling clutch hydraulics).

The control sequence shown in FIG. 15 is programmed in the computer 201c of the transmission control unit 201 and repeatedly executed at predefined periods. That is to say, processing in the following steps 1501 to 1505 is executed by the transmission control unit 201.

In step 1501 (computing desired clutch torque), depending on a particular operational state such as vehicle start or a shift change, the transmission control unit 201 sets the desired transmission torque TTS2 of the second clutch 1209 from the range position signal RngPos, the accelerator pedal stepping-on stroke Aps, the input shaft speed Ni, the output shaft speed No, the braking pressure Pbrk or the brake ON/OFF signal Brk, and other factors.

Details of step 1502 (judging engagement permission) will be later described per FIG. 16. Similarly, details of step 1503 ((computing a clutch standby load) will be later described per FIGS. 17 and 18, details of step 1504 (computing a desired clutch load), per FIG. 19, and details of step 1505 (controlling clutch hydraulics), per FIG. 20.

Step 1502 (judging engagement permission) in FIG. 15 is detailed below using FIG. 16.

Figure 16:
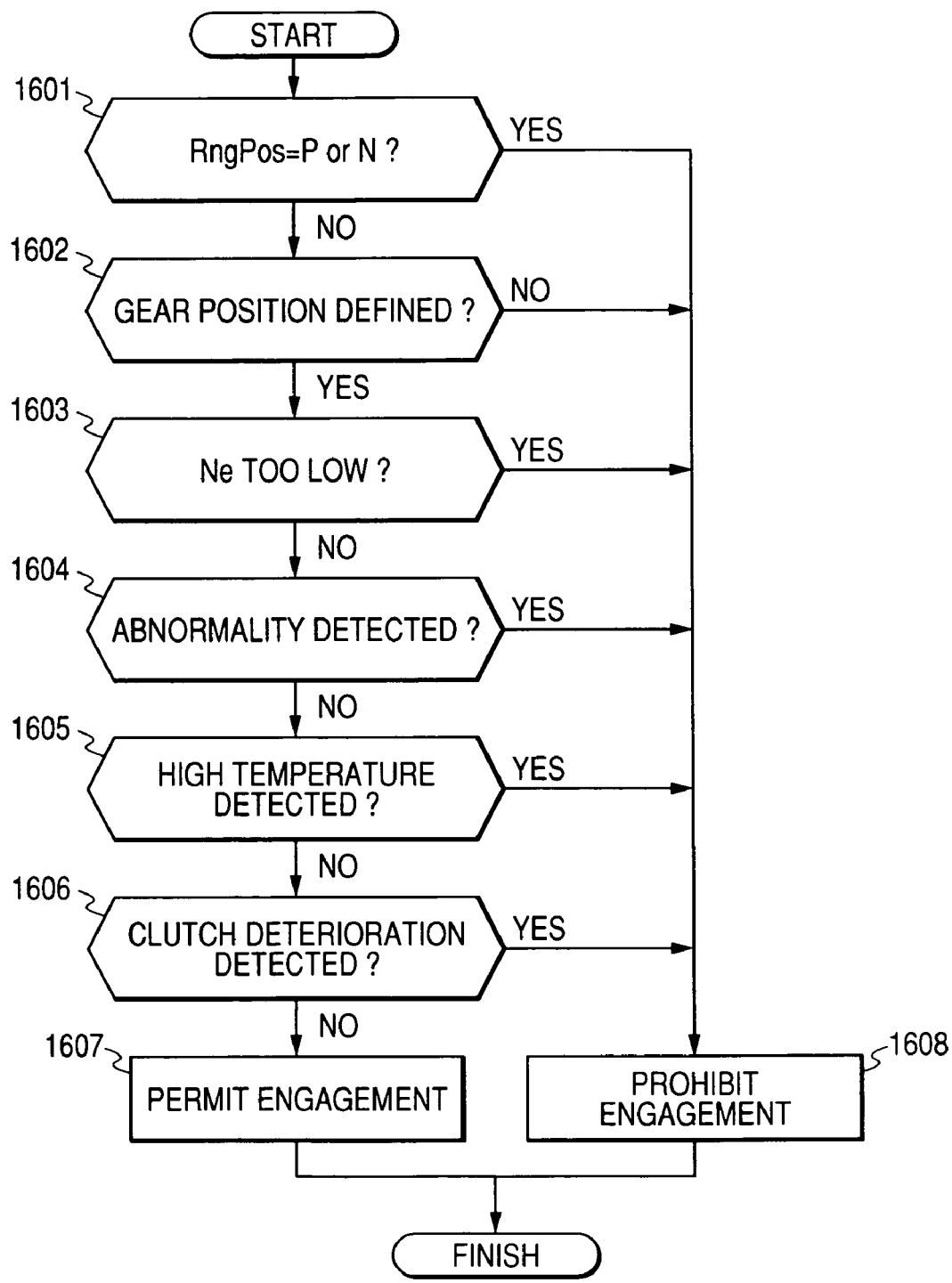
FIG. 16 is a flowchart showing a control sequence of engagement permission judgment, one of control items on the second clutch controlled by the controller for an automatic transmission according to the second embodiment of the present invention.

FIG. 16 is a flowchart showing a control sequence of engagement permission judgment, one of control items on the second clutch controlled by the controller for an automatic transmission according to the second embodiment of the present invention.

In step 1602 of FIG. 16, the transmission control unit 201 judges whether the range position signal RngPos is indicative of a non-driving range (range P or N). If the signal is indicative of the non-driving range (range P or N), control unit 201 advances control to step 1608 and inhibits engagement. If the signal is indicative of any other range, the transmission control unit 201 advances control to step 1602.

If the signal is indicative of any other range, namely, a driving range such as range D, range 2, range 1, or range R, whether an associated gear position is established is judged in step 1602. If the gear position is not established, control unit 201 advances control to step 1608 and inhibits engagement. If the signal is indicative of any other range, the transmission control unit 201 advances control to step 1603.

If the gear position is established, whether the engine speed is too low is judged in step 1603. The judgment is conducted to prevent engine stall. If the engine speed is judged to be too low, control is advanced to step 1608 and engagement is inhibited. If the engine speed is judged not to be too low, control is advanced to step 1604.

If the engine speed is not too low, whether a system abnormality (failure) is occurring is judged in step 1604. If an abnormality is detected, for example, if a solenoid valve, speed sensor, or position sensor failure is detected or a line pressure abnormality is detected or too low battery voltage is detected, control is advanced to step 1608 and clutch engagement is inhibited. If no abnormality or failure is detected, control is advanced to step 1605.

If no abnormality or failure is detected, whether a temperature abnormality is occurring is judged in step 1605. If either the lubricating oil temperature TEMPlub or the clutch temperature TEMPclh is too high, control is advanced to step 1608 and clutch engagement is inhibited. If no temperature abnormality is detected, control is advanced to step 1606. Desirably, an element for estimating a surface temperature of a clutch facing during the judgment in step 1605 is provided and the control sequence is constructed such that if estimated temperature is too high, control will also be advanced to step 1608.

If the temperature is not too high, whether the clutch is deteriorated is judged in step 1606. This judgment on clutch deterioration may be by, for example, estimating an friction coefficient of the clutch and detecting whether a significant departure from design data is occurring, or may be based on a difference between a desired shift change time and an actual shift change time requirement. If clutch deterioration is detected, control is advanced to step 1608 and clutch engagement is inhibited. If clutch deterioration is not detected, control is advanced to step 1607 and clutch engagement is permitted.

The control sequence can be constructed to include, in addition to the judgments in steps 1601 to 1606 of FIG. 16, the steps of detecting sudden deceleration or antilock brake system (ABS) operation and conducting a clutch engagement inhibition judgment from detection results on sudden deceleration or ABS operation. It is further possible to provide a lubricating oil flow measuring element or estimating element and to construct the control sequence so that if an underflow into the clutch is detected, clutch engagement will also be inhibited.

Next, details of step 1503 (computing a clutch standby load) in FIG. 15 will be described using FIGS. 17 and 18.

Figure 17:
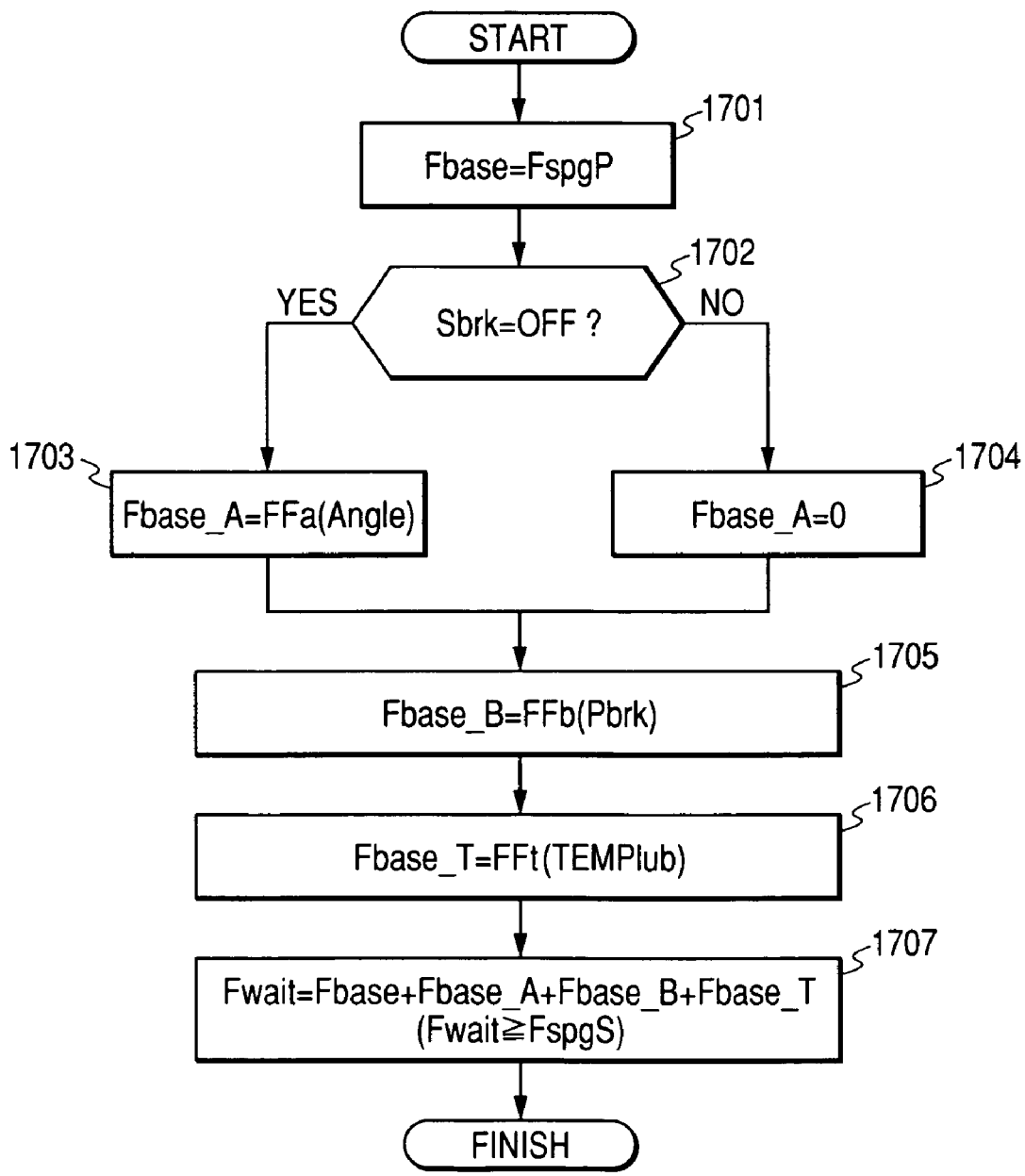
FIG. 17 is a flowchart that shows clutch standby load computation control, one of control items on the second clutch controlled by the controller for an automatic transmission according to the second embodiment of the present invention.

FIG. 17 is a flowchart that shows clutch standby load computation control, one of control items on the second clutch controlled by the controller for an automatic transmission according to the second embodiment of the present invention. FIG. 18 is an explanatory diagram of the functions used during clutch standby load computation, one of control items on the input shaft clutch controlled by the controller for an automatic transmission according to the second embodiment of the present invention. FIG. 18 (A) shows a function FFa that indicates a gradient correction load value Fbase_A with respect to the road surface gradient Angle. FIG. 18 (B) shows a function FFb that indicates a brake correction load Fbase_B with respect to the braking pressure Pbrk. FIG. 18 (C) shows a function FFt that indicates a temperature correction load Fbase_C with respect to the lubricating oil temperature TEMPlub.

In step 1701 of FIG. 17, the transmission control unit 201 calculates a reference standby load Fbase. A spring compressive load FspgP is assigned to the reference standby load Fbase. The spring compressive load FspgP here is set from characteristics of the return spring 1209e of the second clutch 1209 so that FspgP becomes equal to FspgS+K×Stroke, where FspgS denotes a spring set load, K a spring constant, and Stroke a clearance (stroke) of the second clutch 1209. The spring compressive load FspgP is desirably correctable by providing an element that learns device error variations on the spring set load FspgS, on the spring constant K, and on the clearance Stroke of the second clutch 1209, and changes in characteristics with time.

The above is followed by step 1702, in which it is then judged whether the side brake is applied. If the side brake ON/OFF signal Sbrk is in an OFF state, control is advanced to step 1703 and the standby load correction value Fbase_A based on the road surface gradient is set by means of the function FFa with the road surface gradient Angle as an input. If the side brake ON/OFF signal Sbrk is in an ON state, control is advanced to step 1704 and the standby load correction value Fbase_A based on the road surface gradient is set to be zero. The function FFa here is desirably set so that as the road surface gradient Angle increases (this means an upslope), the standby load correction value Fbase_A based on the road surface gradient is set to be greater. The road surface gradient Angle in this case means that regardless of whether the vehicle is traveling forward or in reverse, as the Angle increases, the road becomes a steeper upslope with respect to the traveling direction. In this case, while the present embodiment detects the road surface gradient Angle by means of the gradient sensor 306, the detection may be by communication with a so-called navigation system that is a vehicle-mounted information device, or may be by estimation from a driving drag, vehicle acceleration, vehicle speed, or the like.

Processing in step 1703 or 1704 is followed by step 1705, in which the standby load correction value Fbase_B based on the braking pressure is then set by means of the function FFb with the braking pressure Pbrk as an input. The function FFb here is desirably set so that as shown in FIG. 18 (B), when the braking pressure Pbrk is high enough, the standby load correction value Fbase_B based on the braking pressure will be set to have a minus value. Also, while, in the present embodiment, the braking pressure Pbrk that is a signal from the braking pressure sensor 304 is used to set the standby load correction value Fbase_B based on the braking pressure, Fbase_B setting may use a sensor that detects the stepping-on force on the brake pedal. Additionally, when the vehicle has a mechanism such as a so-called electric brake, the control sequence can be constructed so that braking force based on an output of a brake-operating unit is detected to achieve coordination between load control of the second clutch 1209 and the output of the brake-operating unit.

The above is followed by step 1706, in which the standby load correction value Fbase_T based on the lubricating oil temperature is then set by means of the function FFt with the lubricating oil temperature TEMPlub as an input. The function FFt here is desirably set so that as shown in FIG. 18 (c), when the lubricating oil temperature TEMPlub is high, the standby load correction value Fbase_T based on the lubricating oil temperature will be set to have a minus value.

Finally, in step 1707, a standby load Fwait is calculated by adding the reference standby load Fbase, the standby load correction value Fbase_A based on the road surface gradient, the standby load correction value Fbase_B based on the braking pressure, and the standby load correction value Fbase_T based on the lubricating oil temperature, and restricting a minimum allowable spring set load of the return spring 1209e by means of FspgS. The control sequence may be constructed so that a standby load correction value subject to a particular value of the driving range such as D, 2, 1, or R is calculated and then added during the calculation of the standby load Fwait. Alternatively, the control sequence may be constructed in order for the transmission control unit 201 to have independent data settings for each range position in so-called manual shift change mode. The control sequence may otherwise be constructed so that a standby load correction value subject to a particular value of the change gear position such as the first-speed gear position or second-speed gear position is calculated and then added during the calculation of the standby load Fwait.

In FIG. 17, a door switch that detects door opening/closing can also be provided so that when a door switch OFF (door opening) is detected, the standby load Fwait will be set as the spring set load FspgS.

In addition, a sensor that detects vehicle rollback (reverse rotation of the output shaft) can be provided to obtain a further increased standby load during the detection of reversing in addition to standby load correction based on the road surface gradient.

Furthermore, the control sequence may be constructed so that during standby load correction based on the road surface gradient, the desired transmission torque TTS2 of the second clutch 1209 is corrected in step 1501 (computing desired clutch torque) of FIG. 15. It suffices if, as an outcome, the standby load can be changed according to the particular road surface gradient.

Moreover, the control sequence may be constructed so that during standby load correction based on the braking pressure, the standby load correction value Fbase_A subject to the road surface gradient is multiplied taking the braking pressure Pbrk as a gain table.

Beside, the control sequence is desirably constructed so that when a braking pressure detector is not present and thus the ON/OFF signal indicating whether the brake is in an applied or released condition is used as a brake switch input, a judgment based on brake switch ON/OFF will be conducted in addition to the side brake ON/OFF signal Sbrk-based judgment in step 1702.

Next, details of step 1504 (computing a desired clutch load) in FIG. 15 will be described using FIG. 19.

Figure 19:
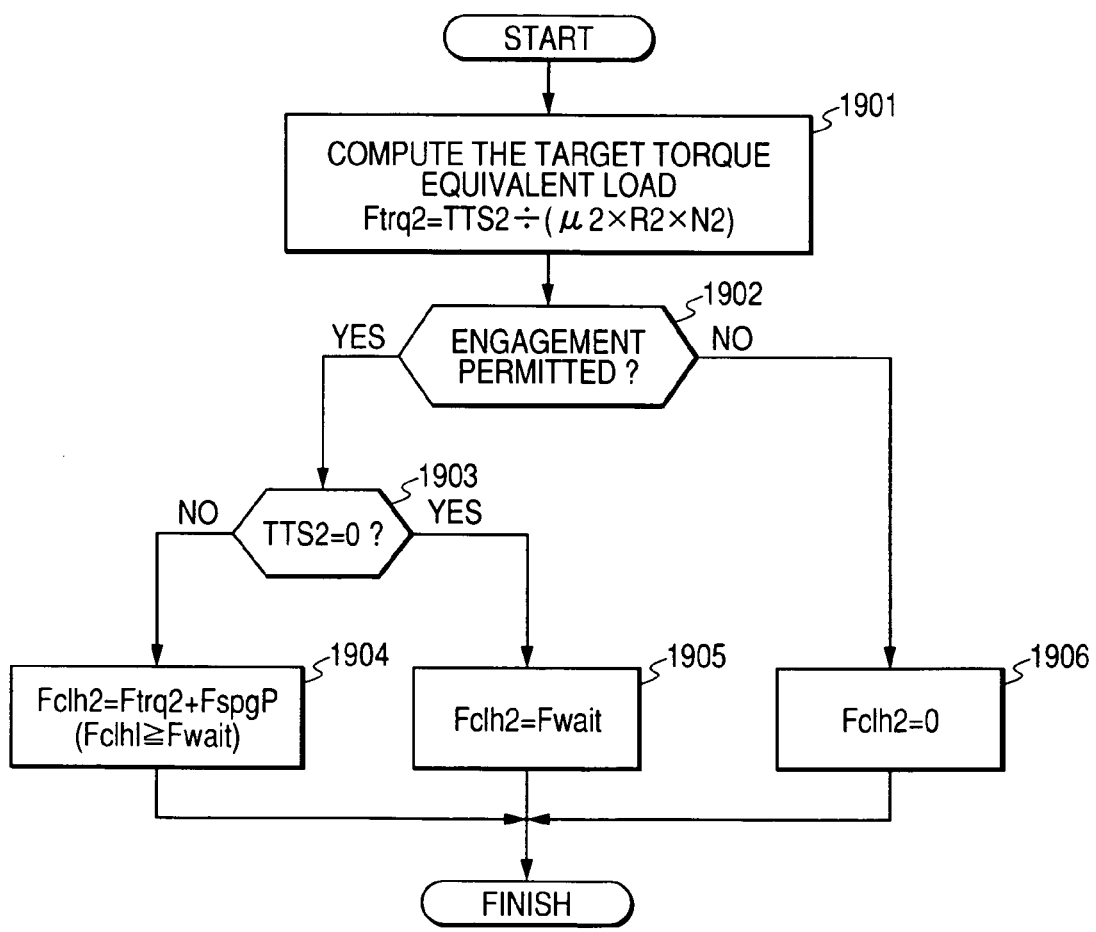
FIG. 19 is a flowchart that shows target clutch standby load computation control, one of control items on the second clutch controlled by the controller for an automatic transmission according to the second embodiment of the present invention.

FIG. 19 is a flowchart that shows clutch standby load computation control, one of control items on the second clutch controlled by the controller for an automatic transmission according to the second embodiment of the present invention.

In step 1901 of FIG. 19, the transmission control unit 201 calculates, by using the desired transmission torque TTS2 of the second clutch 1209 that was calculated in step 1501 (computing desired clutch torque) of FIG. 15, a load Ftrq2 equivalent to the desired torque. The load Ftrq2 equivalent to the desired torque is calculated from Ftrq2=TTS2+($\mu$2×R2×N2), where $\mu$2 is the friction coefficient of the second clutch 1209, R2 a friction surface effective radius, and N2 the number of friction surfaces.

Next, the clutch engagement inhibition/permission judgment results in FIG. 16 are examined in step 1902 and if engagement is inhibited, control is advanced to step 1906 and a target load Fclh2 of the second clutch 1209 is set to be zero. If engagement is permitted, control is advanced to step 1903.

If engagement is permitted, it is judged in step 1903 whether the desired transmission torque TTS2 is zero. If the desired transmission torque TTS2 is zero, this state is judged to be a standby state and control is advanced to step 1905, in which, in accordance with the standby load Fwait set in step 1707 of FIG. 17, the target load Fclh2 of the second clutch 1209 is then set to be equal to the standby load Fwait. If the desired transmission torque TTS2 is not zero, control is advanced to step 1904, in which control is advanced to step 1904 to define the target load Fclh2 of the second clutch 1209 by adding the spring compressive load FspgP to the desired transmission torque Ftrq2 and restricting a minimum allowable value by means of the standby load Fwait.

The controller desirably has a lubricating oil flow regulator so that when the target load Fclh2 is other than zero, the lubricating oil is increased in flow rate.

In addition, the controller is desirably constructed such that when the clutch is released, the spring set load will be gradually reduced to FspgS at a particular releasing pace of the clutch, especially unless immediate release is requested, after the target load Fclh2 has been reduced to the standby load Fwait. When immediate release is requested, the target load Fclh2 is desirably set to be zero.

Next, details of step 1505 (controlling clutch hydraulics) in FIG. 15 will be described using FIG. 20.

Figure 20:
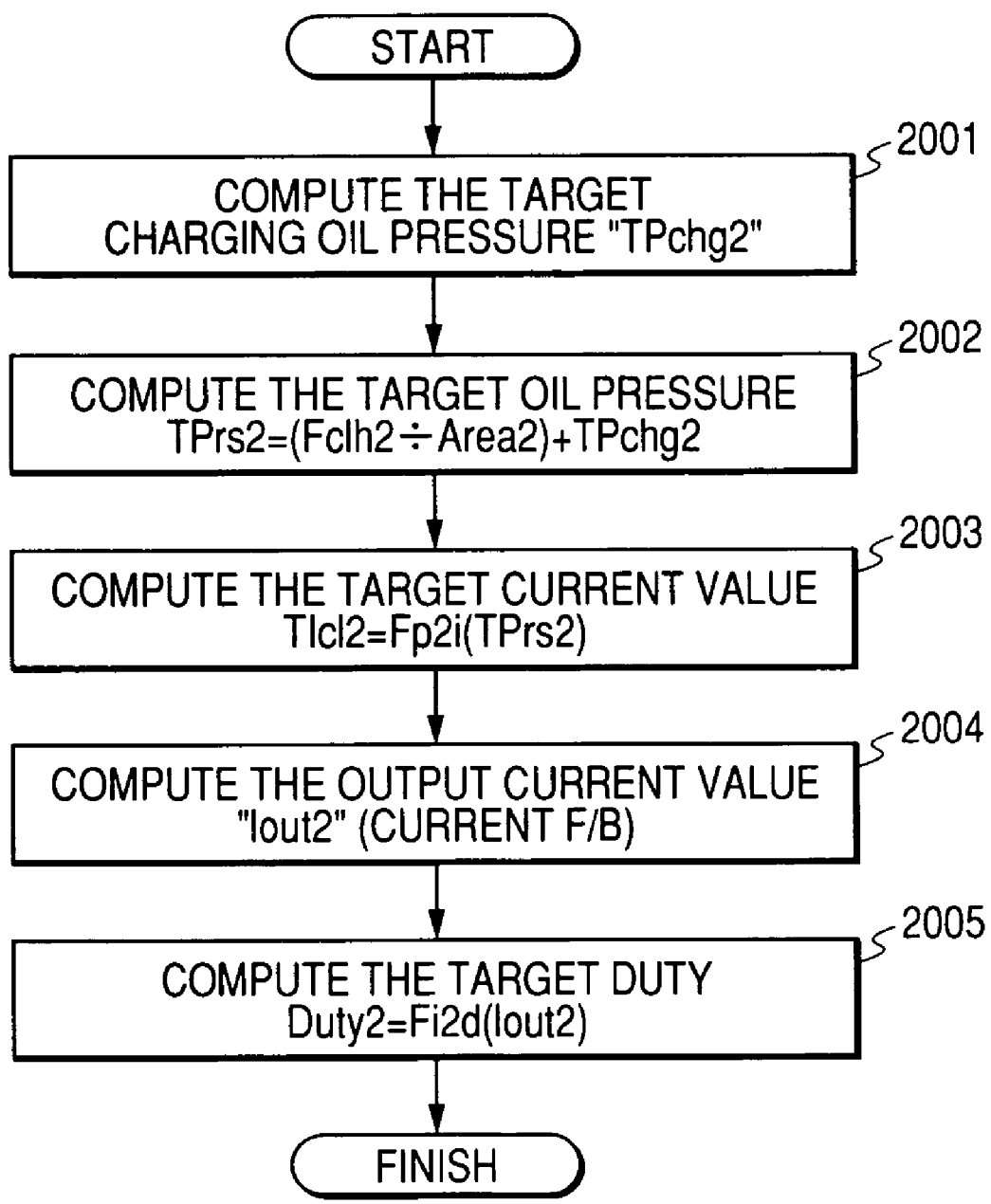
FIG. 20 is a flowchart that shows clutch hydraulics control, one of control items on the second clutch controlled by the controller for an automatic transmission according to the second embodiment of the second invention.

FIG. 20 is a flowchart that shows clutch hydraulics control, one of control items on the second clutch controlled by the controller for an automatic transmission according to the second embodiment of the present invention.

In step 2001, the transmission control unit 201 sets a target charging oil pressure TPchg2. Charging control is a process step in which the pressure plate 1209c compresses the return spring 1209e in order to charge the oil compartment 1209d with oil for enhanced moving speed. The target charging oil pressure TPchg2 and the time required for output of TPchg2 are set on the basis of a temperature and other factors of the oil. In other words, the target charging oil pressure changes from zero to a required value during a start of charging, and returns to zero after a required time has elapsed.

Next, a target oil pressure TPrs2 is set in step 2002. The target oil pressure TPrs2 is calculated by dividing the target load Fclh2 that was set in FIG. 19, by a pressure-bearing area Area2 of the pressure plate 1209c, and then adding results of the division to the target charging oil pressure TPchg2. Centrifugal oil pressure correction and/or temperature correction is desirably conducted during the calculation of the target oil pressure TPrs2.

Next, the target oil pressure TPrs2 that was set in step 2002 is converted into a target current of an associated solenoid valve. A basic target current TIcl2 is calculated by means of a function Fp2i with the target oil pressure TPrs2 as an input. The function Fp2i here is a value set from characteristics of the solenoid valve 105b.

Next, in step 2004, feedback based on a deviation between the setting of the basic target current TIcl2 in step 2003 and the actual current detected by the current detection circuit is conducted and corrections for changes in power supply voltage, in temperature, and in other operating conditions are further conducted to calculate an output current Iout2.

Finally, the output current Iout2 that was set in step 2004 is converted into a duty ratio of an applied voltage. A target duty ratio Duty2 is calculated by means of a function Fi2d with the output current Iout2 as an input. The function Fi2d is set from a total electrical resistance value that incorporates electrical characteristics of the solenoid valve 105b, harnessing, connectors, and other factors.

Examples of vehicle start control based on the control sequences shown in FIGS. 15 to 20 will be next described using FIGS. 21 to 23.

First, a first example of vehicle start control based on the sequences of FIGS. 15 to 20 is described below using FIG. 21. This first example of vehicle start control is concerned with the control sequence of a so-called creeping vehicle start that ranges from a range position signal level change from range N to range D, to a start of the vehicle. This example of vehicle start control assumes that the road surface gradient Angle is zero (flat surface).

FIG. 21 is a timing chart showing the first example of vehicle start control by the controller for an automatic transmission according to the second embodiment of the present invention.

In FIG. 21(A), indicates the range position signal RngPos. Symbol N denotes a signal level equivalent to range N, and symbol D denotes a position signal level equivalent to range D. FIG. 21(B) indicates the braking pressure signal Pbrk. FIG. 21(C) indicates the accelerator pedaling stroke (accelerator angle position) signal Aps. FIG. 21(D) indicates the road surface gradient signal Angle. FIG. 21(E) indicates the lubricating oil temperature signal TEMPlub. FIG. 21(F) indicates the target clutch torque signal TTS2 of the second clutch 1209. FIG. 21(G) indicates a current of the solenoid valve 105b. FIG. 21(H) indicates a position of the pressure plate 1209c. In FIG. 21(H), ST0 denotes a position to which the pressure plate 1209c is completely pushed back by the return spring 1209e, and ST1 denotes a position at which the pressure plate 1209c compresses the return spring 1209e to increase clutch transmission torque to a value equal to or greater than zero.

Until time t1 has been reached, as shown in FIG. 21(A), the range position signal RngPos indicates "N" (range N) and the braking pressure signal Pbrk is at a required level, so the vehicle is in a stopped state. At this time, since step 1601 in FIG. 16 is conducted to judge that engagement is inhibited, the target load Fclh2 is set to be zero in step 1902, 1906 of FIG. 19. Consequently, the current of the solenoid valve 105b becomes zero as shown in FIG. 21(G), and the pressure plate 1209c is positioned at ST0 as shown in FIG. 21(H).

As shown in FIG. 21(A), at time t1, when the range position signal RngPos level changes from "N" (range N) to "D" (range D), and at time t2, when a gear position is established, step 1607 in FIG. 16 is executed to judge that clutch engagement is permitted, and step 1905 in FIG. 19 is executed. Thus, in accordance with both the standby load Fwait calculated from the data settings of FIGS. 18(A), (B), (C), and the target charging oil pressure TPchg2 set in step 2001 of FIG. 20, the current of the solenoid valve 105b is controlled according to the particular setting of the target duty Duty2 in step 2005 of FIG. 20, as shown-in FIG. 21(G). Accordingly, during a period from time t2 to time t3, as shown in FIG. 21 (H), the position of the pressure plate 1209c gently changes from ST0 to ST2 to stand by at ST2.

Figure 18A:
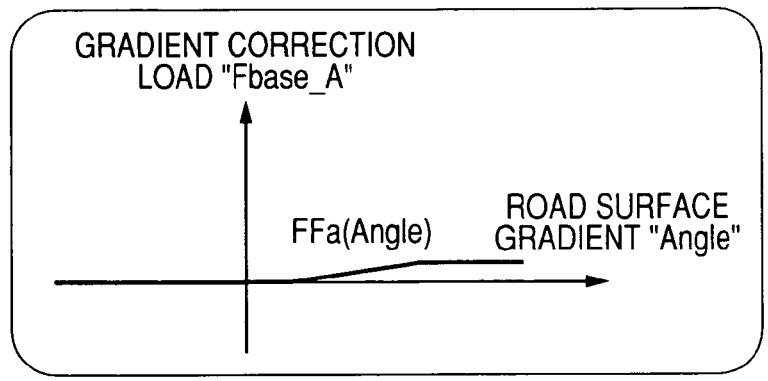
FIG. 18 is an explanatory diagram of the functions used during clutch standby load computation, one of control items on the input shaft clutch controlled by the controller for an automatic transmission according to the second embodiment of the present invention.
Figure 18B:
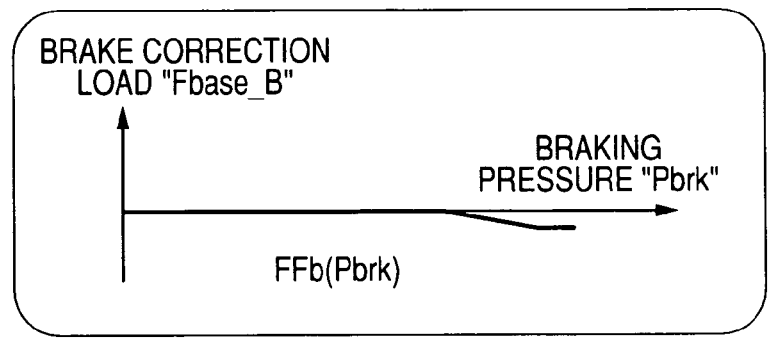
Figure 18C:
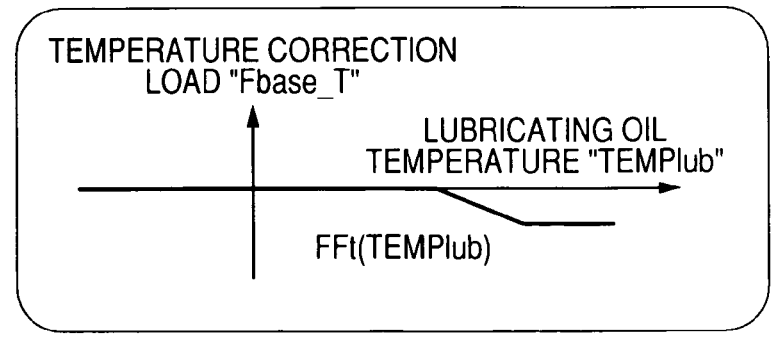

As shown in FIG. 21(B), during a period from time t3 to time t4, when the braking pressure Pbrk gradually approaches zero, the standby load correction value Fbase_B based on the braking pressure, set in step 1705 of FIG. 17, also gradually approaches zero in accordance with the data setting of FIG. 18(B). Accordingly, the standby load Fwait progressively rises and the current of the solenoid valve 105b gradually increases according to the particular setting of the target duty Duty2 in step 2005 of FIG. 20, as shown in FIG. 21(G). Thus, as shown in FIG. 21(H), the position of the pressure plate 1209c gently changes from ST2 to ST1.

At time t4, when the braking pressure Pbrk becomes zero as shown in FIG. 21(B), step 1501 in FIG. 15 is executed to judge that the brake has been released, and the vehicle starts creeping. In step 1501 of FIG. 15, the second clutch target torque TTS2 required for creeping is calculated, and as shown in FIG. 21(F), TTS2 progressively rises from zero. As the second clutch target torque TTS2 changes, the target duty Duty2 is finally set in step 1904 of FIG. 19 and in FIG. 20, whereby as shown in FIG. 21(G), the current of the solenoid valve 105b further increases and the vehicle starts propulsion. Control will be completed at time t5 when vehicle speed and others fully rise.

In the stopped state of the vehicle during the period from time t1 to time t4 as described above, since the standby load Fwait defined in FIG. 17 changes in response to the braking pressure Pbrk, the standby position of the pressure plate 1209c changes from ST0 to ST2 and further from ST2 to ST1. It is therefore possible to realize a rapid start of creeping at time t4 and thus to avoid a decrease in driving performance due to a delay in response during a start of creeping.

Next, a second example of vehicle start control based on the control sequences of FIGS. 15 to 20 is described below using FIG. 22. This second example of vehicle start control is concerned with the control sequence of a so-called creeping vehicle start that ranges from a range position signal level change from range N to range D, to a start of the vehicle. This example of vehicle start control assumes a plus road surface gradient Angle (upslope).

FIG. 22 is a timing chart showing the second example of vehicle start control by the controller for an automatic transmission according to the second embodiment of the present invention.

The time shown on a horizontal axis in FIG. 22 is the same as in FIG. 21. Also, meanings of (A) to (H) in FIG. 22 are the same as those of (A) to (H) in FIG. 21.

Processing at up to time t1 is the same as in FIG. 21. As shown in FIG. 22(A), the range position signal RngPos indicates "N" (range N), and as shown in FIG. 22(B), the braking pressure signal Pbrk is at a required level, so the vehicle is in a stopped state. At this time, since step 1601 in FIG. 16 is conducted to judge that engagement is inhibited, the target load Fclh2 is set to be zero in step 1902, 1906 of FIG. 19. Consequently, the current of the solenoid valve 105b becomes zero as shown in FIG. 22(G), and the pressure plate 1209c is positioned at ST0 as shown in FIG. 22 (H). Since the first example of vehicle start control assumes an upslope, the road surface gradient signal Angle in FIG. 22(D) indicates a required value.

As shown in FIG. 22(A), at time t1, when the range position signal RngPos level changes from "N" (range N) to "D" (range D), and at time t2, when a gear position is established, step 1607 in FIG. 16 is executed to judge that clutch engagement is permitted, and step 1905 in FIG. 19 is executed. Thus, in accordance with both the standby load Fwait calculated from the data settings of FIGS. 18(A), (B), (C), and the target charging oil pressure TPchg2 set in step 2001 of FIG. 20, the current of the solenoid valve 105b is controlled according to the particular setting of the target duty Duty2 in step 2005 of FIG. 20, as shown in FIG. 22(G). Accordingly, during a period from time t2 to time t3, as shown in FIG. 22(H), the position of the pressure plate 1209c gently changes from ST0 to ST2 to stand by at ST2.

As shown in FIG. 22(B), during a period from time t3 to time t4, when the braking pressure Pbrk gradually approaches zero, the standby load correction value Fbase_B based on the braking pressure, set in step 1705 of FIG. 17, also gradually approaches zero in accordance with the data setting of FIG. 18(B). Accordingly, the standby load Fwait progressively rises and the current of the solenoid valve 105b gradually increases according to the particular setting of the target duty Duty2 in step 2005 of FIG. 20, as shown in FIG. 22(G). The actual torque transmitted by the second clutch 1209 also gradually rises to prevent rollback, even on the upslope. At this time, the particular standby load correction value. Fbase_B subject to the braking pressure in FIG. 18(A) and the particular standby load correction value Fbase_A subject to the road surface gradient in FIG. 18(B) permit the vehicle to start propulsion before the braking pressure in FIG. 22(B) becomes zero.

At time t4, when the braking pressure Pbrk becomes zero as shown in FIG. 22(B), step 1501 in FIG. 15 is executed to judge that the brake has been released, and the vehicle starts creeping. In step 1501 of FIG. 15, the second clutch target torque TTS2 required for creeping is calculated, and as shown in FIG. 22(F), TTS2 progressively rises from zero. As the second clutch target torque TTS2 changes, the target duty Duty2 is finally set in step 1904 of FIG. 19 and in FIG. 20, whereby as shown in FIG. 22(G), the current of the solenoid valve 105b further increases and the vehicle starts propulsion. Control will be completed at time t5 when vehicle speed and others fully rise.

In the stopped state of the vehicle during the period either from time t1 to time t3 or from time t1 to time t4 as described above, since the standby load Fwait defined in FIG. 17 changes in response to the braking pressure Pbrk and the road surface gradient Angle, the standby position of the pressure plate 1209c changes from ST0 to ST1. It is therefore possible to avoid rollback due to a decrease in the braking pressure Pbrk during the period from time t3 to time t4, to realize a rapid start of creeping, and thus to avoid a decrease in driving performance due to a delay in response during a start of creeping.

The examples shown in FIGS. 21 and 22 assume that the clutch is positioned at ST0 before time t1 is reached, that is, when the range position signal is indicating range N. However, the clutch may be positioned at ST2, instead of ST0. The response during the start of creeping can thus be further accelerated.

Next, a third example of vehicle start control based on the control sequences of FIGS. 15 to 20 is described below using FIG. 23. This third example of vehicle start control is concerned with the control sequence of a so-called creeping vehicle start that ranges from a range position signal level change from range N to range D, to a start of the vehicle. This example of vehicle start control assumes that the lubricating oil temperature TEMPlub is high.

FIG. 23 is a timing chart showing the third example of vehicle start control by the controller for an automatic transmission according to the second embodiment of the present invention.

The time shown on a horizontal axis in FIG. 23 is the same as in FIG. 21. Also, meanings of (A) to (H) in FIG. 23 are the same as those of (A) to (H) in FIG. 21.

Processing at up to time t1 is the same as in FIG. 21. As shown in FIG. 23(A), the range position signal RngPos indicates "N" (range N), and as shown in FIG. 23(B), the braking pressure signal Pbrk is at a required level, so the vehicle is in a stopped state. At this time, since step 1601 in FIG. 16 is conducted to judge that engagement is inhibited, the target load Fclh2 is set to be zero in step 1902, 1906 of FIG. 19. Consequently, the current of the solenoid valve 105b becomes zero as shown in FIG. 23(G), and the pressure plate 1209c is positioned at ST0 as shown in FIG. 23(H). As shown in FIG. 23(E), the lubricating oil temperature TEMPlub is high, compared with that shown in FIGS. 21, 22.

As shown in FIG. 23(A), at time t1, when the range position signal RngPos level changes from "N" (range N) to "D" (range D), and at time t2, when a gear position is established, step 1607 in FIG. 16 is executed to judge that clutch engagement is permitted, and step 1905 in FIG. 19 is executed. Thus, in accordance with both the standby load Fwait calculated from the data settings of FIGS. 18(A), (B), (C), and the target charging oil pressure TPchg2 set in step 2001 of FIG. 20, the current of the solenoid valve 105b is controlled according to the particular setting of the target duty Duty2 in step 2005 of FIG. 20, as shown in FIG. 23(G). At this time, as shown in FIG. 23(H), the pressure plate 1209c remains at position ST0 and stands by thereat.

As shown in FIG. 23(B), during a period from time t3 to time t4, when the braking pressure Pbrk gradually approaches zero, the standby load correction value Fbase_B based on the braking pressure, set in step 1705 of FIG. 17, also gradually approaches zero in accordance with the data setting of FIG. 18(B). Accordingly, the standby load Fwait progressively rises and the current of the solenoid valve 105b gradually increases according to the particular setting of the target duty Duty2 in step 2005 of FIG. 20, as shown in FIG. 23(G). Also, as shown in FIG. 23(H), the position of the pressure plate 1209c gently changes from ST0 to ST2 and stands by at ST2.

At time t4, when the braking pressure Pbrk becomes zero as shown in FIG. 23(B), step 1501 in FIG. 15 is executed to judge that the brake has been released, and the vehicle starts creeping. In step 1501 of FIG. 15, the second clutch target torque TTS2 required for creeping is calculated, and as shown in FIG. 23(F), TTS2 progressively rises from zero. As the second clutch target torque TTS2 changes, the target duty Duty2 is finally set in step 1904 of FIG. 19 and in FIG. 20, whereby as shown in FIG. 23(G), the current of the solenoid valve 105b further increases and this, in turn, changes the position of the pressure plate 1209c from ST2 to ST1 as shown in FIG. 23(H). The vehicle thus starts propulsion. Control will be completed at time t5 when vehicle speed and others fully rise.

In the stopped state of the vehicle during the period from time t1 to time t4 as described above, since, depending on the lubricating oil temperature TEMPlub, the standby load Fwait defined in FIG. 17 is set to take a value smaller than in FIGS. 21, 22, it is possible to avoid a further increase in clutch temperature, even when the lubricating oil temperature TEMPlub is high.

What is claimed is:

1. A controller for a motor vehicle gear-type transmission which comprising:
    a friction transmission mechanism which transmits power by adjusting a pressure member that applies a pressure to a friction surface;
    an input shaft which rotates by receiving the torque transmitted from the friction transmission mechanism;
    an output shaft which outputs torque to a driving shaft of a motor vehicle;
    a plurality of gear pairs each rotating between the input shaft and the output shaft;
    a plurality of mesh mechanisms each establishing a required change gear position by connecting any one of the plural gear pairs to the input shaft or the output shaft; and
    an actuator which adjusts the position or pressure load of the pressure member;
    wherein the controller includes a control apparatus that is configured to change, by using at least one parameter indicating a state of the gear-type transmission or of the vehicle, a position at which the pressure member is caused to stand by while the driving shaft is in a stopped state or during changeover of any one of the mesh mechanisms that connects to any one of the gear pairs;
    wherein the change is carried out prior to a driver's operation of start or acceleration; and
    wherein the stand by is within an open state in which the friction transmission mechanism does not transmit the power.

2. The controller for a motor vehicle gear-type transmission according to claim 1, wherein:
    a driving electric current of the actuator is utilized to cause the position at which the pressure member stands by will be changed by at least one of parameters each indicating a state of the gear-type transmission or of the vehicle.

3. The controller for a motor vehicle gear-type transmission according to claim 1, wherein:
    the at least one parameter used is a road surface gradient; and
    the control apparatus changes the position at which the pressure member is caused to stand by in accordance with the road surface gradient.

4. The controller for a motor vehicle gear-type transmission according to claim 1, wherein:
    the at least one parameter used is brake pedal stepping-on force; and
    the control apparatus changes the position at which the pressure member is caused to stand by in accordance with the brake pedal stepping-on force.

5. The controller for a motor vehicle gear-type transmission according to claim 1, wherein:
    the at least one parameter used is a pressure of a braking hydraulic cylinder; and
    the control apparatus changes the position at which the pressure member is caused to stand by in accordance with the pressure of the braking hydraulic cylinder.

6. The controller for a motor vehicle gear-type transmission according to claim 1, wherein:
    the at least one parameter used is an operating/non-operating state of a parking brake; and
    the control apparatus changes the position at which the pressure member is caused to stand by in accordance with the operating/non-operating state of the parking brake.

7. The controller for a motor vehicle gear-type transmission according to claim 1, wherein:
    the at least one parameter used is a friction surface temperature of the friction transmission mechanism; and
    the control apparatus changes the position at which the pressure member is caused to stand by in accordance with the friction surface temperature of the friction transmission mechanism.

8. The controller for a motor vehicle gear-type transmission according to claim 1, wherein:
    the at least one parameter used is a temperature of a lubricating oil which lubricates the friction transmission mechanism; and
    the control apparatus changes the position at which the pressure member is caused to stand by in accordance with the temperature of the lubricating oil.

9. The controller for a motor vehicle gear-type transmission according to claim 1, wherein the driver's operation of start or acceleration is a release of a brake pedal or stepping on an accelerator pedal.

10. A controller for a motor vehicle gear-type transmission adapted to:
    transmit power to the motor vehicle gear-type transmission by adjusting a pressure member that applies a pressure to a friction surface of a friction transmission mechanism;
    establish a required change gear position by connecting any one of plural gear pairs each rotating between an input shaft and output shaft which form part of the motor vehicle gear-type transmission, to the input shaft or the output shaft via any one of plural mesh mechanisms; and
    output a torque from the output shaft of the motor vehicle gear-type transmission to a driving shaft of a motor vehicle;
    wherein the controller comprises control apparatus configured to change, by using at least parameter indicating a state of the gear-type transmission or of the vehicle, a position at which the pressure member is caused to stand by during changeover of any one of the mesh mechanisms that connects to any one of the gear pairs;
    wherein the change is carried out prior to a driver's operation of start or acceleration; and
    wherein the stand by is within an open state in which the friction transmission mechanism does not transmit the power.

11. The controller for a motor vehicle gear-type transmission according to claim 10, wherein the driver's operation of start or acceleration is a release of a brake pedal or stepping on an accelerator pedal.

12. A method for controlling a motor vehicle gear-type transmission which has:
- a friction transmission mechanism which transmits power by adjusting a pressure member that applies a pressure to a friction surface;
- an input shaft which rotates by receiving the torque transmitted from the friction transmission mechanism;
- an output shaft which outputs torque to a driving shaft of a motor vehicle;
- a plurality of gear pairs each rotating between the input shaft and the output shaft;
- a plurality of mesh mechanisms each establishing a required change gear position by connecting any one of the plural gear pairs to the input shaft or the output shaft; and
- an actuator which adjusts the position or pressure load of the pressure member;
- wherein the control method comprises changing, by at least one parameter indicating a state of the gear-type transmission or of the vehicle, a position at which the pressure member is caused to stand by while the driving shaft is in a stopped state or during changeover of any one of the mesh mechanisms that connects to any one of the gear pairs;
- wherein the change is carried out prior to a driver's operation of start or acceleration; and
- wherein the stand by is within an open state in which the friction transmission mechanism does not transmit the power.

13. The controller for a motor vehicle gear-type transmission according to claim 12, wherein the driver's operation of start or acceleration is a release of a brake pedal or stepping on an accelerator pedal.

14. A controller for a motor vehicle gear-type transmission adapted to:
- transmit power to the motor vehicle gear-type transmission by adjusting a pressure member that applies a pressure to a friction surface of a friction transmission mechanism; and
- output a torque from an output shaft of the motor vehicle gear-type transmission to a driving shaft of a motor vehicle;
- wherein the controller comprises a control apparatus configured to change, by using at least one parameter indicating a state of the gear-type transmission or of the vehicle, a position at which the pressure member is caused to stand by while the driving shaft is in a stopped state;
- wherein the change is carried out prior to a driver's operation of start or acceleration; and
- wherein the stand by is within an open state in which the friction transmission mechanism does not transmit the power.

15. The controller for a motor vehicle gear-type transmission according to claim 14, wherein the driver's operation of start or acceleration is a release of a brake pedal or stepping on an accelerator pedal.

16. A controller for a motor vehicle gear-type transmission which comprising:
- a friction transmission mechanism which transmits power by adjusting a pressure member that applies a pressure to a friction surface;
- an input shaft which rotates by receiving the torque transmitted from the friction transmission mechanism;
- an output shaft which outputs torque to a driving shaft of a motor vehicle;
- a plurality of gear pairs each rotating between the input shaft and the output shaft;
- a plurality of mesh mechanisms each establishing a required change gear position by connecting any one of the plural gear pairs to the input shaft or the output shaft; and
- an actuator which adjusts the position or pressure load of the pressure member;
- wherein the controller controls a driving electric current of the actuator such that a position at which the pressure member is caused to stand by while the driving shaft is in a stopped state or during changeover of any one of the mesh mechanisms that connects to any one of the gear pairs is changed by the at least one parameter indicating a state of the gear-type transmission or of the vehicle;
- wherein the change is carried out prior to a driver's operation of start or acceleration; and
- wherein the stand by is within an open state in which the friction transmission mechanism does not transmit the power.

17. The controller for a motor vehicle gear-type transmission according to claim 16, wherein the driver's operation of start or acceleration is a release of a brake pedal or stepping on an accelerator pedal.

18. A control system for a motor vehicle gear-type transmission, comprising:
- a controller for the motor vehicle gear-type transmission adapted to transmit power to the motor vehicle gear-type transmission by adjusting a pressure member that applies a pressure to a friction surface of a friction transmission mechanism, establish a required change gear position by connecting any one of plural gear pairs each rotating between an input shaft and output shaft which form part of the motor vehicle gear-type transmission, to the input shaft or the output shaft via any one of plural mesh mechanisms, and output a torque from the output shaft of the motor vehicle gear-type transmission to a driving shaft of a motor vehicle; and
- an actuator which adjusts the position or pressure load of the pressure member with a control command from the controller of the motor vehicle gear-type transmission;
- wherein the control system comprises control apparatus configured to change, by at least one parameter indicating a state of the gear-type transmission or of the vehicle, a position at which the pressure member is caused to stand by while the driving shaft is in a stopped state or during changeover of any one of the mesh mechanisms that connects to any one of the gear pairs;
- wherein the change is carried out prior to a driver's operation of start or acceleration; and
- wherein the stand by is within an open state in which the friction transmission mechanism does not transmit the power.

19. The controller for a motor vehicle gear-type transmission according to claim 18, wherein the driver's operation of start or acceleration is a release of a brake pedal or stepping on an accelerator pedal.

* * * * *